US008892840B2

(12) United States Patent
Saito et al.

(10) Patent No.: US 8,892,840 B2
(45) Date of Patent: Nov. 18, 2014

(54) COMPUTER SYSTEM AND DATA MIGRATION METHOD

(71) Applicant: Hitachi, Ltd., Tokyo (JP)

(72) Inventors: Hideo Saito, Yokohama (JP); Yoshiaki Eguchi, Yokohama (JP); Masayuki Yamamoto, Sagamihara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/892,349

(22) Filed: May 13, 2013

(65) Prior Publication Data

US 2013/0254504 A1 Sep. 26, 2013

Related U.S. Application Data

(63) Continuation of application No. 12/988,523, filed as application No. PCT/JP2010/004982 on Aug. 6, 2010, now Pat. No. 8,443,160.

(51) Int. Cl.
*G06F 12/00* (2006.01)
*G06F 3/06* (2006.01)
(52) U.S. Cl.
CPC .............. *G06F 3/0647* (2013.01); *G06F 3/067* (2013.01); *G06F 3/0617* (2013.01)
USPC .............................. 711/165; 711/156; 709/221
(58) Field of Classification Search
USPC .................... 711/162, 156, 165; 709/221
See application file for complete search history.

(56) References Cited

U.S. PATENT DOCUMENTS 6,976,103 B1 * 12/2005 Watanabe et al. .............. 710/74
7,093,088 B1    8/2006 Todd et al.
7,130,941 B2   10/2006 Okada et al.
7,149,859 B2   12/2006 Fujibayashi
7,343,467 B2 *  3/2008 Brown et al. ................ 711/203

(Continued)

FOREIGN PATENT DOCUMENTS

JP   2002-82775 A    3/2002
JP   2003-345522 A  12/2003

(Continued)

*Primary Examiner* — Kalpit Parikh
(74) *Attorney, Agent, or Firm* — Mattingly & Malur, PC

(57) ABSTRACT

A computer system and data migration method capable of replacing a storage apparatus with another storage apparatus and avoiding stopping data transmission or reception between a host computer and the storage apparatuses without depending on the configuration of existing storage apparatuses and other devices is suggested.

With a computer system having a host computer and first and second storage apparatuses, the second storage apparatus virtualizes first logical units in the first storage apparatus and provides them as second logical units to the host computer, collects configuration information about each first logical unit, and sets each piece of the collected configuration information to each corresponding second logical unit; and the host computer adds a path to the second logical units and deletes a path to the first logical units; and the second storage apparatus copies data stored in the first logical units to a storage area provided by the second storage device and associates the storage area with the second logical units.

10 Claims, 23 Drawing Sheets

(56) References Cited

U.S. PATENT DOCUMENTS

| | | |
|---|---|---|
| 2004/0049553 A1 | 3/2004 | Iwamura et al. |
| 2004/0250021 A1 | 12/2004 | Honda et al. |
| 2006/0248302 A1 | 11/2006 | Yamamoto et al. |
| 2007/0011423 A1 | 1/2007 | Kaneda et al. |
| 2007/0101097 A1 | 5/2007 | Serizawa et al. |
| 2007/0113037 A1 | 5/2007 | Eguchi et al. |
| 2007/0266216 A1 | 11/2007 | Arakawa et al. |
| 2007/0271434 A1 | 11/2007 | Kawamura et al. |
| 2007/0283366 A1 | 12/2007 | Iwamura et al. |
| 2008/0177947 A1 | 7/2008 | Eguchi et al. |
| 2009/0055586 A1 | 2/2009 | Kawamura et al. |
| 2009/0089498 A1 | 4/2009 | Hay |
| 2010/0070722 A1 | 3/2010 | Otani et al. |

FOREIGN PATENT DOCUMENTS

| | | |
|---|---|---|
| JP | 2004-13215 A | 1/2004 |
| JP | 2004-102374 A | 4/2004 |
| JP | 2004-220450 A | 8/2004 |
| JP | 2006-155640 A | 6/2006 |
| JP | 2007-18455 A | 1/2007 |
| JP | 2007-122432 A | 5/2007 |
| JP | 2007-310495 A | 11/2007 |
| JP | 2008-47142 A | 2/2008 |
| JP | 2008-152807 A | 7/2008 |
| JP | 2008-176627 A | 7/2008 |
| JP | 2010-73202 A | 4/2010 |

* cited by examiner

COMPUTER SYSTEM AND DATA MIGRATION METHOD

This is a continuation application of U.S. Ser. No. 12/988,523, filed Oct. 19, 2010, which is a 371 National Stage of PCT/JP2010/004982, filed on Aug. 6, 2010. The entire disclosures of all of these applications are hereby incorporated by reference.

TECHNICAL FIELD

The present invention relates to a computer system and a data migration method. Particularly, this invention is suited for use in data migration when replacing a storage apparatus with another storage apparatus.

BACKGROUND ART

A conventional computer system that handles large-scale data manages the data by using a large-capacity storage apparatus provided separately from a host system.

When an existing storage apparatus is to be replaced with a new storage apparatus in such a computer system, it is necessary to migrate data stored in the existing storage apparatus to the new storage apparatus in order to continue using the data stored in the existing storage apparatus. In order to do so, the computer system is required to be capable of migrating the data without stopping data transmission or reception between a host computer and the storage apparatuses. Furthermore, when migrating the data between the existing storage apparatus and the new storage apparatus, a method that does not require any special function in already installed apparatuses/devices such as the existing storage apparatus, the host computer, and a network is favorable.

In this case, for example, Patent Literature 1 mentioned below discloses a technique for migrating data by setting logical units in an existing storage apparatus as external volumes, then migrating an access target of a host computer to a new storage apparatus by using an alternate path program and then copying data stored in the logical units belonging to the existing stored apparatus to logical units belonging to the new storage apparatus by using a copy function. If the data migration method disclosed in Patent Literature 1 is used, it is possible to migrate data between the storage apparatuses without using any special function of the existing storage apparatus or the network or without stopping data transmission or reception between the host computer and the storage apparatuses.

CITATION LIST

Patent Literature

[PTL (Patent Literature) 1]
Japanese Patent Application Laid-Open (Kokai) Publication No. 2004-220450

SUMMARY OF INVENTION

Technical Problem

By the data migration method disclosed in Patent Literature 1, the alternate path program mounted on the host computer exclusively uses a path to the existing storage apparatus and a path to the new storage apparatus in order to maintain data integrity. However, the alternate path program may not sometimes be able to use the paths exclusively depending on the type of an operating system mounted on the host computer. In such a case, there is a problem of inability to use the data migration method disclosed in Patent Literature 1.

On the other hand, if another data migration method that does not depend on the exclusive function of the alternate path program mounted on the host computer is used, there is a possibility that data in the existing storage apparatus and data in the new storage apparatus may be accessed in parallel. As a means for maintaining data integrity under the above-described circumstances, there is a method for performing remote copying of data between the existing storage apparatus and the new storage apparatus; however, as a result, a special function of the existing storage apparatus will have to be used. So, there has been no data migration method that does not depend on any special function of the existing storage apparatus.

The present invention was devised in consideration of the above-described circumstances and intends to suggest a computer system and data migration method capable of migrating data between storage apparatuses without stopping data transmission or reception or without using any special function of already existing apparatuses/devices.

Solution to Problem

In order to solve the above-mentioned problems, a computer system according to the present invention has: a host computer; a first storage apparatus which has one or more first storage devices and provides the host computer with a storage area of the first storage devices as first logical units; and a second storage apparatus which has one or more second storage devices; wherein the second storage apparatus virtualizes each of the first logical units in the first storage apparatus and provides them as second logical units to the host computer, collects configuration information about each first logical unit from the first storage apparatus, and sets the collected configuration information about each first logical unit to each corresponding second logical unit; and the host computer adds a path to the second logical units as an alternate path target and deletes a path to the first logical units as the alternate path target; and wherein the second storage apparatus copies data stored in the first logical units in the first storage apparatus to a storage area provided by the second storage devices and associates the storage area with the second logical units.

Furthermore, a data migration method according to this invention for migrating data from a first storage apparatus to a second storage apparatus in a computer system including a host computer, the first storage apparatus which has one or more first storage devices and provides the host computer with a storage area of the first storage devices as first logical units, and the second storage apparatus which has one or more second storage devices is designed so that the data migration method includes: a first step executed by the second storage apparatus of virtualizing each of the first logical units in the first storage apparatus and providing them as second logical units to the host computer, collecting configuration information about each first logical unit from the first storage apparatus, and setting the collected configuration information about each first logical unit to each corresponding second logical unit; and a second step of adding a path to the second logical units as an alternate path target and deleting a path to the first logical units as the alternate path target under the control of the host computer, and copying data stored in the first logical units in the first storage apparatus to a storage area provided by the second storage devices and associating the storage area with the second logical units under the control of the second storage apparatus.

Advantageous Effects of Invention

According to the present invention, data can be migrated between storage apparatuses without using any special function of already existing apparatuses/devices or without stopping data transmission or reception.

DESCRIPTION OF EMBODIMENTS

An embodiment of the present invention will be explained in detail with reference to the attached drawings.

(1) First Embodiment (1-1) Configuration of Computer System

Figure 1:
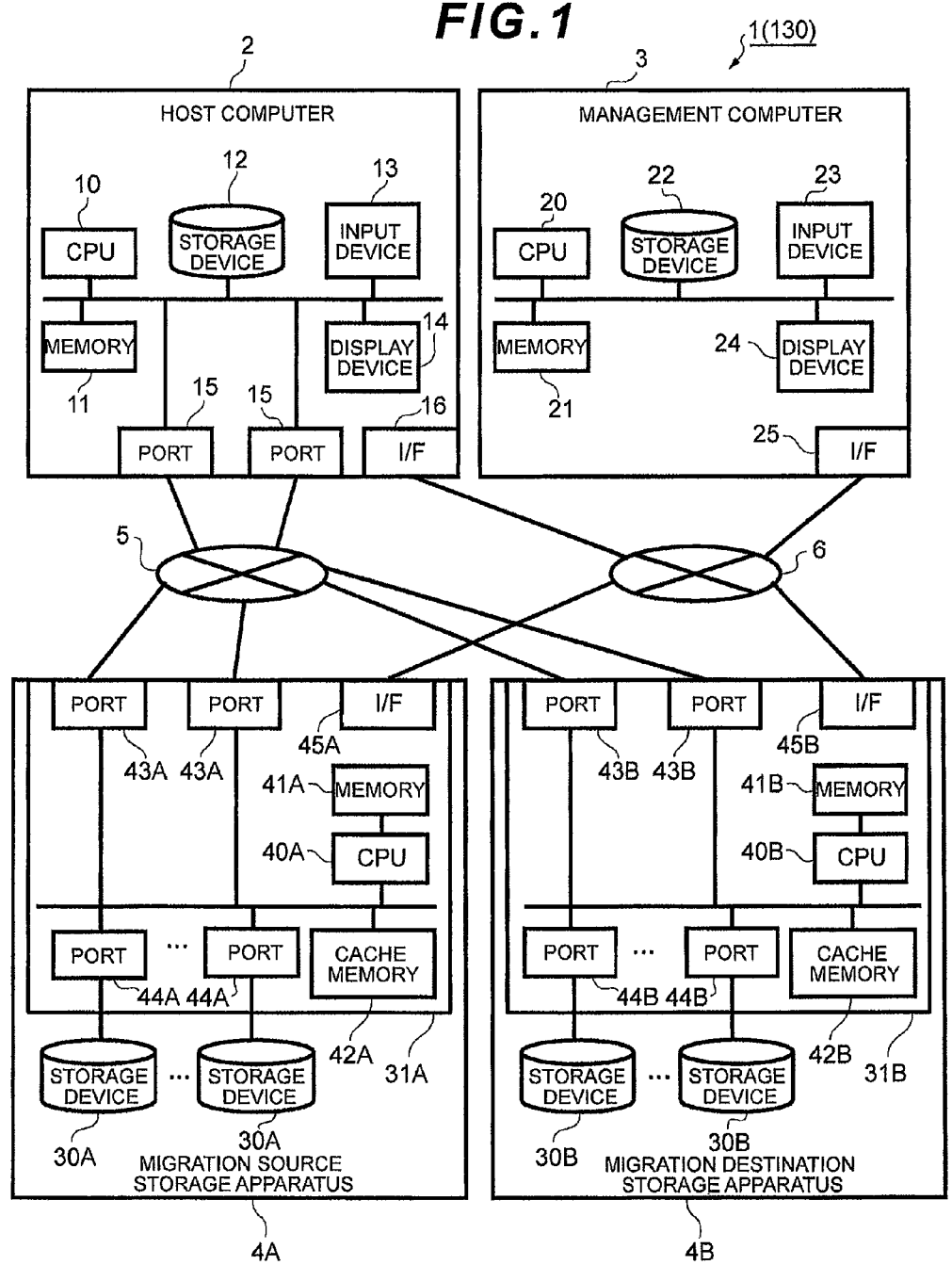
FIG. 1 is a block diagram showing the overall configuration of a computer system according to first and second embodiments.

Referring to FIG. 1, the reference numeral 1 represents a computer system as a whole according to this embodiment. This computer system 1 includes a host computer 2, a management computer 3, two storage apparatuses 4A, 4B, a SAN (Storage Area Network) 5, and a LAN (Local Area Network) 6. The host computer 2 is connected via the SAN (Storage Area Network) 5 to each storage apparatus 4A, 4B and the management computer 3 is connected via the LAN (Local Area Network) 6 to the host computer 2 and each storage apparatus 4A, 4B.

The host computer 2 includes a CPU 10, a memory 11, a storage device 12, an input device 13, a display device 14, a plurality of ports 15, and an interface control unit 16. The CPU 10 is a processor for controlling the operation of the entire host computer 2, and reads various programs stored in the storage device 12 to the memory 11 and executes them. The memory 11 is used to store the various programs read by the CPU 10 from the storage device 12 when activating the host computer 2 and is also used as a working memory for the CPU 10.

The storage device 12 is composed of, for example, a hard disk device or an SSD (Solid State Drive) and is used to store and retain various programs and control data. The input device 13 is composed of, for example, a keyboard switch, a pointing device, and a microphone; and the display device 14 is composed of, for example, a liquid crystal display. Each port 15 is an adapter for connecting the host computer 2 to the SAN 5 and the interface control unit 16 is an adapter for connecting the host computer 2 to the LAN 6.

The management computer 3 is a computer device for managing the host computer 2 and each storage apparatus 4A, 4B and includes a CPU 20, a memory 21, a storage device 22, an input device 23, a display device 24, and an interface control unit 25. The CPU 20 is a processor for controlling the operation of the entire management computer 3, and reads various programs stored in the storage device 22 to the memory 21 and executes them. The memory 21 is used to store the various programs read by the CPU 20 from the storage device 22 when activating the management computer 3 and is also used as a working memory for the CPU 20.

The storage device 22 is composed of, for example, a hard disk device or an SSD and is used to store and retain various programs and control data. The input device 23 is composed of, for example, a keyboard switch, a pointing device, and a microphone; and the display device 24 is composed of, for example, a liquid crystal display. The interface control unit 25 is an adapter for connecting the management computer 3 to the LAN 6.

Each storage apparatus 4A, 4B includes a plurality of storage devices 30A, 30B and a control unit 31A, 31B for controlling data input to, and output from, the storage devices 30A, 30B.

The storage devices 30A, 30B are composed of, for example, expensive disks such as SCSI (Small Computer System Interface) disks or inexpensive disks such as SATA (Serial AT Attachment) disks or optical disks. A plurality of storage devices 30A, 30B constitute one RAID (Redundant Array of Inexpensive Disks) group and one or more logical units are set in physical areas provided by one or more RAID groups. Data from the host computer 2 are stored in units of blocks, each of which is of a specified size.

Each control unit 31A, 31B includes a CPU 40A, 40B, a memory 41A, 41B, a cache memory 42A, 42B, a plurality of ports 43A, 43B on the host side, a plurality of ports 44A, 44B on the storage device side, and an interface control unit 45A, 45B. The CPU 40A, 40B is a processor for controlling the operation of the entire storage apparatus 4A, 4B and reads various programs stored in the storage devices 30A, 30B to the memory 41A, 41B and executes them. The memory 41A, 41B is used to store the various programs read by the CPU 40A, 40B from specific storage devices 30A, 30B when activating the storage apparatus 4A, 4B and is also used as a working memory for the CPU 40A, 40B.

The cache memory 42A, 42B is composed of a semiconductor memory and is used mainly to temporarily store data sent and received between the host computer 2 and the storage devices 30A, 30B. The host-side ports 43A, 43B are adapters for connecting the storage apparatus 4A, 4B to the SAN 5 and the storage-device-side ports 44A, 44B are adapters for the storage devices 30A, 30B. The interface control unit 45A, 45B is an adapter for connecting the storage apparatus 4A, 4B to the LAN 6.

Incidentally, in this embodiment, one of the two storage apparatuses 4A, 4B is an existing storage apparatus that is currently being used (hereinafter referred to as the "migration source storage apparatus 4A") and the other storage apparatus is a new storage apparatus to be introduced in place of the migration source storage apparatus 4A (hereinafter referred to as the "migration destination storage apparatus 4B"). Therefore, in the case of this computer system 1, data stored in the migration source storage apparatus 4A is migrated to the migration destination storage apparatus 4B by the method described later and the migration source storage apparatus 4A is then removed.

Furthermore, in the case of this embodiment, the migration destination storage apparatus 4B is equipped with a so-called external connection function of virtualizing logical units in an external storage apparatus (which is the migration source storage apparatus 4A in this case) and providing them to the host computer 2.

If the migration destination storage apparatus 4B receives a read request for the virtualized logical units in the migration source storage apparatus 4A, it transfers the read request to the migration source storage apparatus 4A and thereby reads the requested data from the migration source storage apparatus 4A and then transfers the read data to the host computer 2. If the migration destination storage apparatus 4B receives a write request whose target is the above-mentioned logical units, it transfers the write request and write target data to the migration source storage apparatus 4A, thereby having the data written to the corresponding address position in the relevant logical volume.

Figure 2:
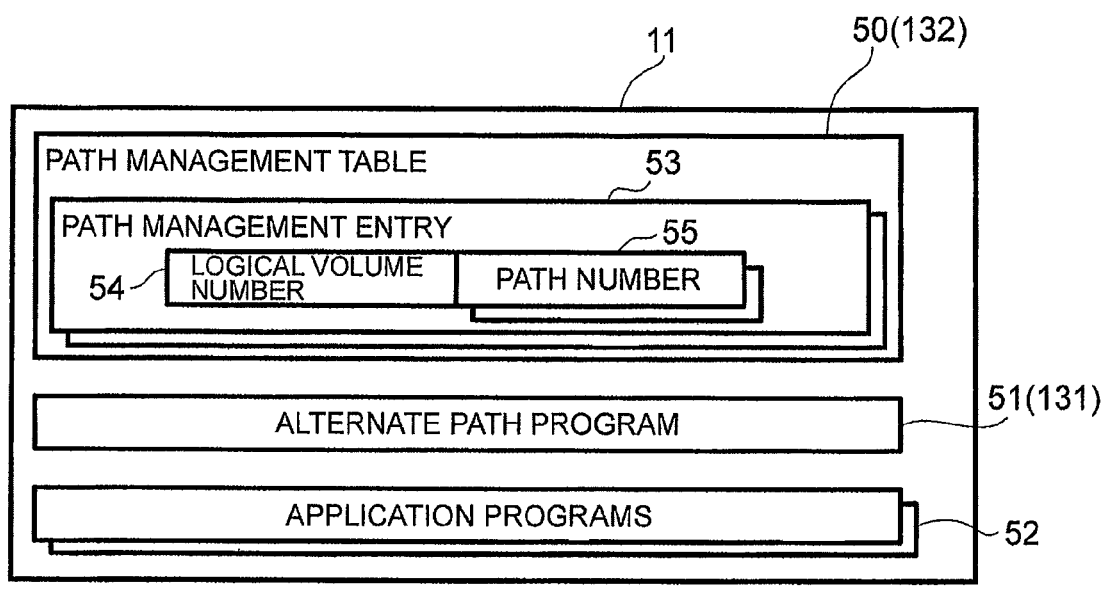
FIG. 2 is a conceptual diagram conceptually showing a data configuration of a memory for a host computer.

FIG. 2 shows a data configuration of the memory 11 for the host computer 2. As can be seen from FIG. 2, the memory 11 for the host computer 2 stores a path management table 50, an alternate path program 51, and a plurality of application programs 52.

The path management table 50 is a table for managing paths connected to logical volumes recognized as storage areas by the host computer 2 and includes one or more path management entries 53 provided corresponding to the individual logical volumes.

A logical volume number 54 that is identification information about the relevant logical volume and a path number 55 that is identification information about each path connected to that logical volume as described later are registered in the path management entry 53. Therefore, if a plurality of paths are set because of a redundant configuration, a plurality of path numbers are registered in the path management entry 53. Incidentally, paths managed by the path management table 50 may be paths to logical units in different storage apparatuses. However, in response to an inquiry by an Inquiry request specified by SCSI standards, those logical units need to return the same response. This is because there is a possibility with the storage apparatuses having different interfaces that a problem of access rejection might occur due to failed integrity with regard to an interface command.

The alternate path program 51 is a program for issuing an input/output request to the migration source storage apparatus 4A or the migration destination storage apparatus 4B based on various information registered in the path management table 50. This alternate path program 51 can provide the application programs 52 with the logical units of the migration source storage apparatus 4A or the migration destination storage apparatus 4B.

Incidentally, when issuing an input/output request to the migration source storage apparatus 4A or the migration destination storage apparatus 4B, the alternate path program 51 refers to the path management table 50, selects one or more paths from among a plurality of paths associated with the corresponding logical volume, and issues the input/output request via the selected path(s) to the migration source storage apparatus 4A or the migration destination storage apparatus 4B.

The application programs 52 are programs for executing processing according to a user's business activities and reads/writes, via logical volumes assigned to them, necessary data from/to logical units (connected with the logical volumes via the path) associated with those logical volumes in the migration source storage apparatus 4A or the migration destination storage apparatus 4B.

Figure 3:
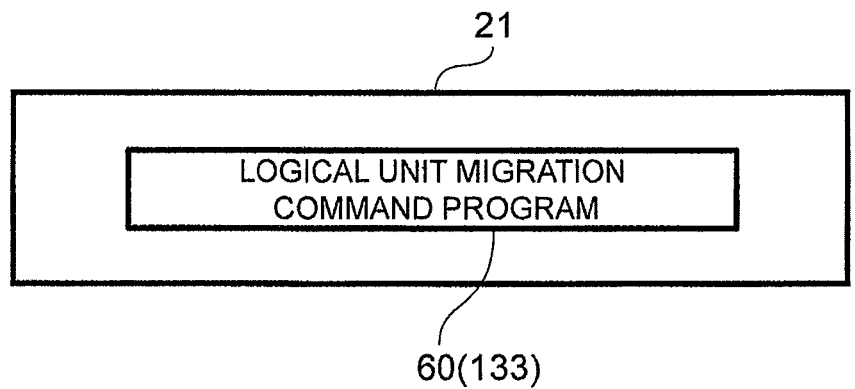
FIG. 3 is a conceptual diagram conceptually showing a data configuration of a memory for a management computer.

FIG. 3 shows a data configuration of the memory 21 for the management computer 3. As can be seen from FIG. 3, the memory 21 for the management computer 3 stores a logical unit migration command program 60. The logical unit migration command program 60 is a program for controlling data migration between the migration source storage apparatus 4A and the migration destination storage apparatus 4B and gives necessary commands to the host computer 2, the migration source storage apparatus 4A, and the migration destination storage apparatus 4B during data migration between the migration source storage apparatus 4A and the migration destination storage apparatus 4B.

Figure 4:
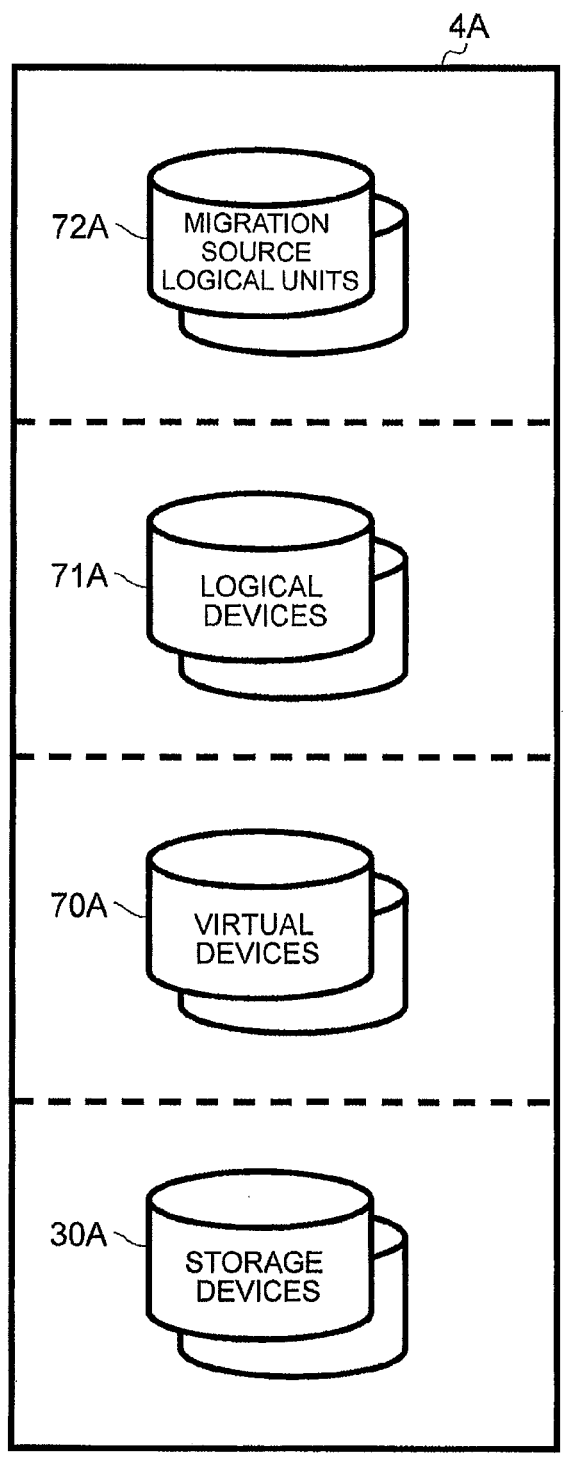
FIG. 4 is a conceptual diagram explaining a hierarchical configuration of storage areas in a migration source storage apparatus.

FIG. 4 shows a hierarchical configuration of storage areas in the migration source storage apparatus 4A. The migration source storage apparatus 4A provides the host computer 2 with storage areas provided by the storage devices 30A as logical units (hereinafter referred to as the "migration source logical units") 72A. In this case, a plurality of intermediate storage tiers for associating the storage devices 30A with the migration source logical units 72A are provided between the storage devices 30A and the migration source logical units 72A. The intermediate storage tiers can include, for example, virtual devices 70A and logical devices 71A.

Each virtual device 70A is an intermediate storage tier between the storage device 30A, which is a lower storage tier, and the logical device 71A which is an upper storage tier. The virtual device 70A is defined in a storage area provided by each of the storage devices 30A which constitute a RAID group. The logical device 71A is the intermediate storage tier connecting the virtual device 70A, which is a lower storage tier, and the migration source logical unit 72A, which is an upper storage tier, and is a storage area formed by gathering all or some storage areas of one or more virtual devices 70A, or is a storage area formed by extracting some of the storage areas of the virtual devices 70A.

Figure 5:
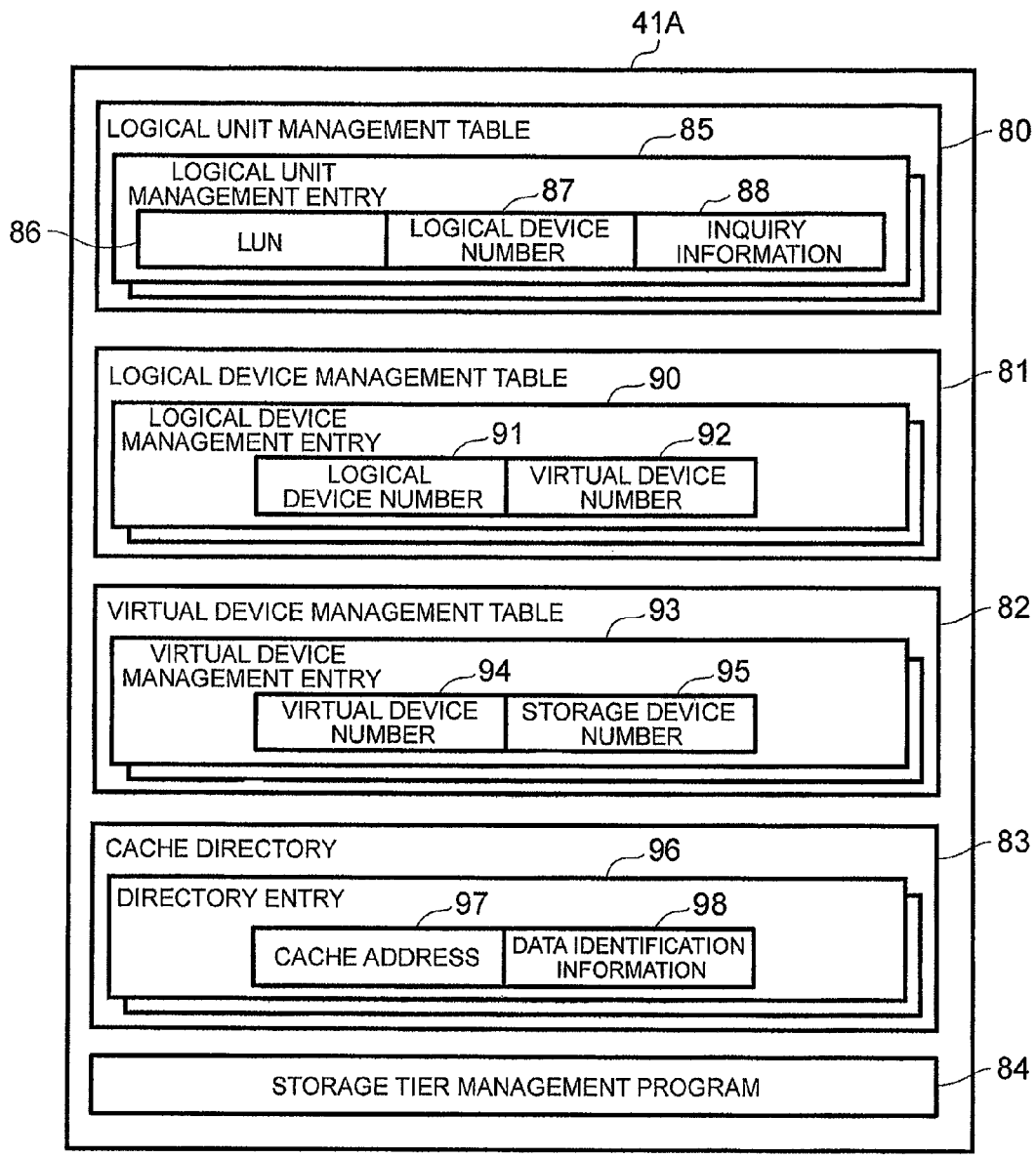
FIG. 5 is a conceptual diagram conceptually showing a data configuration of a memory for the migration source storage apparatus.

FIG. 5 shows a data configuration of the memory 41A for the migration source storage apparatus 4A. As can be seen from FIG. 5, the memory 41A for the migration source storage apparatus 4A stores a storage tier management program 84, a logical unit management table 80, a logical device management table 81, and a virtual device management table 82. The memory 41A for the migration source storage apparatus 4A also stores a cache directory 83 for managing data which is temporarily stored in the cache memory 42A for the migration source storage apparatus 4A.

The storage tier management program 84 is a program for managing a correspondence relationship between a lower storage device and an upper storage device in the migration source storage apparatus 4A and executes various processing described later based on various information stored in the logical unit management table 80, the logical device management table 81, and the virtual device management table 82.

The logical unit management table 80 is a table used by the storage tier management program 84 to manage the migration source logical units 72A which are set in the migration source storage apparatus 4A; and is composed of one or more logical unit management entries 85 provided corresponding to the individual migration source logical units 72A.

An LUN (Logical Unit Number) 86 which is identification information about the relevant migration source logical unit 72A, a logical device number 87, which is identification information about the logical device 71A (FIG. 4) constituting that migration source logical unit 72A, and Inquiry information 88 including configuration information such as an implementation status and a preparation status of the migration source logical unit 72A are registered in the logical unit management entry 85. The Inquiry information 88 can include, in addition to the mounting status and the preparation status of the migration source logical unit 72A, for example, information such as a vendor identifier and a product identifier.

The logical device management table 81 is a table for managing the logical devices 71A which are set in the migration source storage apparatus 4A; and is composed of one or more logical device management entries 90 provided corresponding to the individual logical devices 71A in the migration source storage apparatus 4A. A logical device number 91 of the relevant logical device 71A and a virtual device number 92, which is identification information about the virtual device 70A constituting that logical device 71A (FIG. 4), are registered in the logical device management entry 90.

The virtual device management table 82 is a table for managing the virtual devices 70A which are set in the migration source storage apparatus 4A; and is composed of one or more virtual device management entries 93 provided corresponding to the individual virtual devices 70A in the migration source storage apparatus 4A. A virtual device number 94 of the relevant virtual device 70A and a storage device number 95, which is identification information about each storage device 30A providing that virtual device 70A with a storage area, are registered in the virtual device management entry 93.

The cache directory 83 is information for managing data which are temporarily stored in the cache memory 42A (FIG. 1); and is composed of one or more directory entries 96 provided corresponding to the individual pieces of data stored in the cache memory 42A. A cache address 97 of the relevant data stored in the cache memory 42A and data identification information 98 are registered in the directory entry 96. The cache address 97 represents a starting address of a storage area in which the relevant data in the cache memory 42A is stored. The data identification information 98 is identification information about that data and is generated from, for example, a combination of an LUN and an LBA (Logical Block Address).

Figure 6:
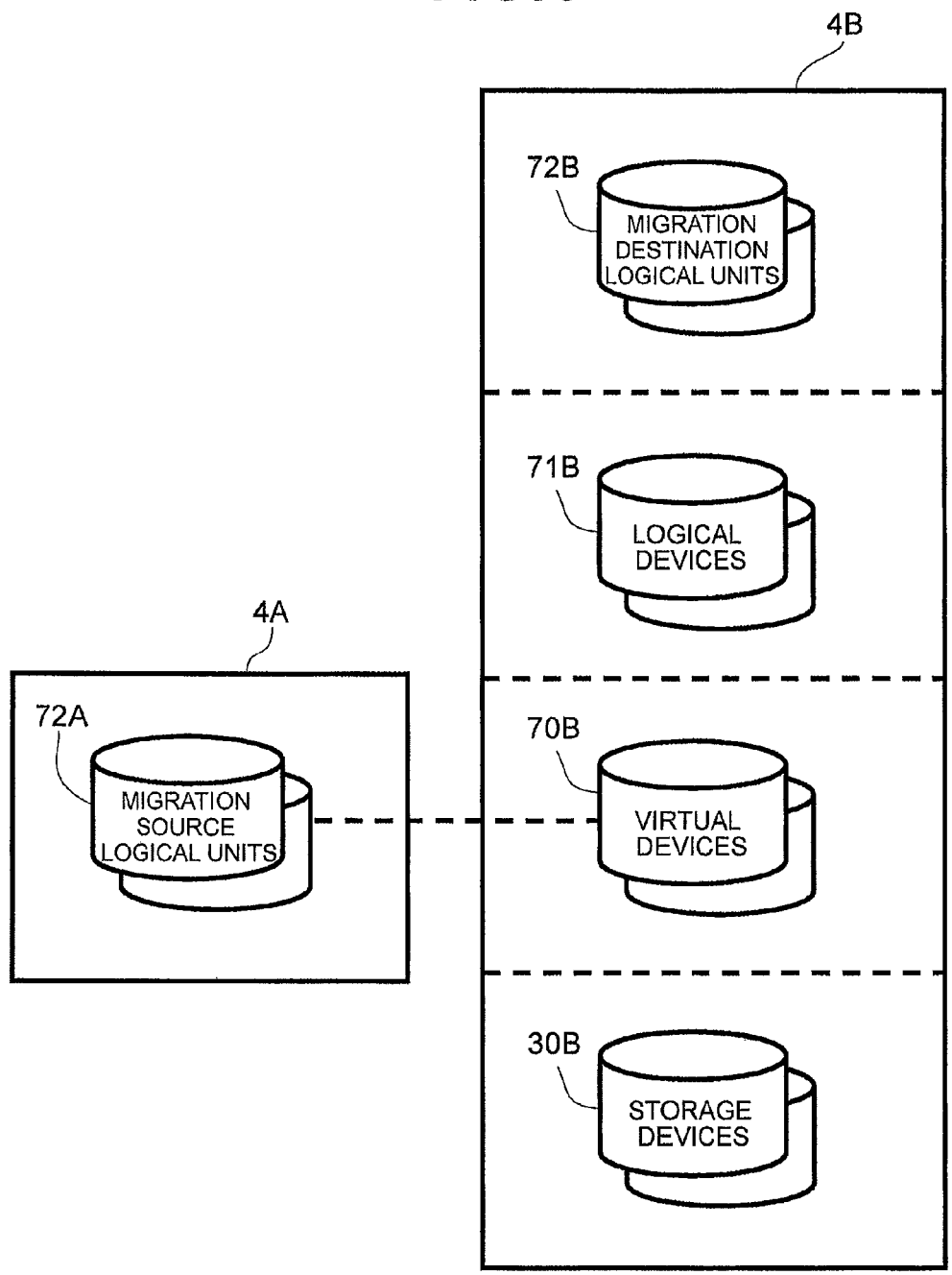
FIG. 6 is a conceptual diagram explaining a hierarchical configuration of storage areas in a migration destination storage apparatus.

FIG. 6 shows a hierarchical configuration of storage areas in the migration destination storage apparatus 4B. The migration destination storage apparatus 4B has the external connection function as mentioned earlier and provides the host computer 2 with storage areas provided by the storage devices 30A or the migration source logical units 72A in the externally connected migration source storage apparatus 4A as logical units in its own storage apparatus (hereinafter referred to as the "migration destination logical units") 72B. In this case, a plurality of intermediate storage tiers for associating the storage devices 30B or the migration source logical units 72A with the migration destination logical units 72B are provided between the storage devices 30B or the migration source logical units 72A and the migration destination logical units 72B. The intermediate storage tiers can include, for example, the virtual devices 70B and the logical devices 71B, but the virtual devices 70B and the logical devices 71B are not necessarily indispensable and either one of, or both, the virtual devices 70B and the logical devices 71B can be omitted.

Each virtual device 70B is the intermediate storage tier connecting the storage device 30B or the migration source logical unit 72A, which is the lower storage tier, and the logical device 71B which is the upper storage tier. If the lower storage tier is the storage device 30B, the virtual device 70B is defined in a storage area provided by each of the storage devices 30B constituting a RAID group. On the other hand, if the lower storage tier is the migration source logical unit 72A, the virtual device 70B transfers a read request or a write request from the host computer 2 to the migration source storage apparatus 4A and read data from, or write data to, the migration source storage apparatus 4A, thereby virtualizing the migration source logical unit 72A as if it were a logical unit (the migration destination logical unit 72B) in the migration destination storage apparatus 4B.

Each logical device 71B is an intermediate storage tier connecting the virtual device 70B, which is the lower storage tier, and the migration destination logical unit 72B which is the upper storage tier; and is composed of a storage area formed by gathering all or some of storage areas in one or more virtual devices 70B, or a storage area formed by extracting some of storage areas in the virtual devices 70B.

Figure 7:
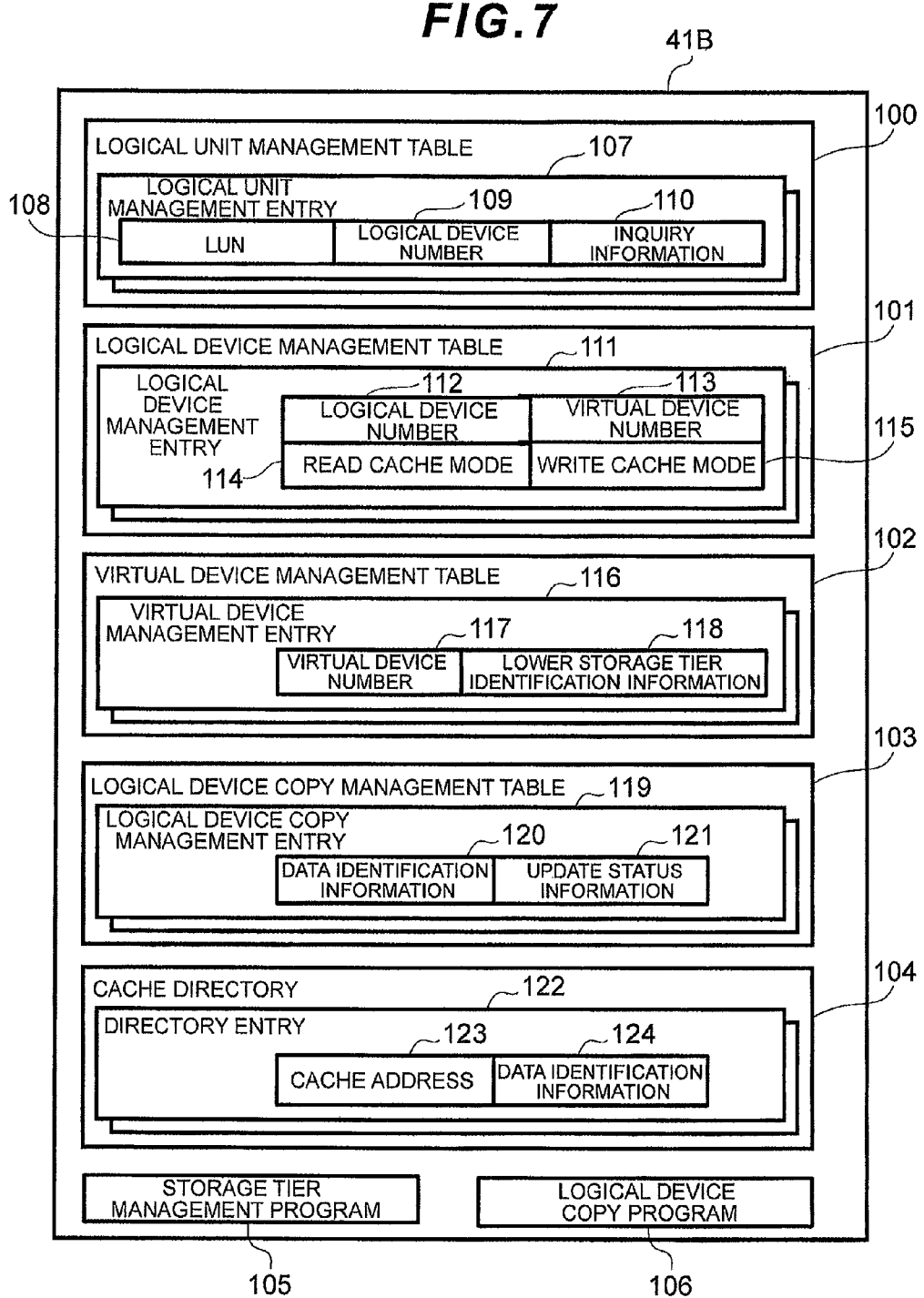
FIG. 7 is a conceptual diagram conceptually showing a data configuration of a memory for the migration destination storage apparatus.

FIG. 7 shows a data configuration of the memory 41B for the migration destination storage apparatus 4B. As can be seen from FIG. 7, the memory 41B for the migration destination storage apparatus 4B stores a storage tier management program 105, a logical device copy program 106, a logical unit management table 100, a logical device management table 101, a virtual device management table 102, and a logical device copy management table 103. The memory 41B for the migration destination storage apparatus 4B also stores a cache directory 104 for managing data which are temporarily stored in the cache memory 42B (FIG. 1) for the migration destination storage apparatus 4B.

The storage tier management program 105 is a program for managing a link between the lower storage device and the upper storage device in the migration destination storage apparatus 4B and has a function similar to that of the storage tier management program 84 for the migration source storage apparatus 4A described earlier with reference to FIG. 5. The logical device copy program 106 is a program for controlling data migration from the migration source storage apparatus 4A to the migration destination storage apparatus 4B. The migration destination storage apparatus 4B copies data stored in the logical devices 71A in the migration source storage apparatus 4A to the corresponding logical devices 71B in the migration destination storage apparatus 4B based on the logical device copy program 106.

The logical unit management table 100 is a table used by the storage tier management program 105 to manage the migration destination logical units 72B in the migration destination storage apparatus 4B. Since the configuration of this logical unit management table 100 is similar to that of the logical unit management table 80 for the migration source storage apparatus 4A described earlier with reference to FIG. 5, an explanation thereof has been omitted.

The logical device management table 101 is a table for managing the logical devices 71B which are set in the migration destination storage apparatus 4B; and is composed of one or more logical device management entries 111 provided corresponding to the individual logical devices 71B. A logical device number 112 of the relevant logical device 71B and a virtual device number 113 of the virtual devices 70B constituting that logical device 71B are registered in the logical device management entry 111. Furthermore, a read cache mode flag 114 and a write cache mode flag 115, whose target is the relevant logical device 71B, are also registered in the logical device management entry 111.

The read cache mode flag 114 is a flag to indicate whether or not a read cache mode is set to the relevant logical device 71B; and the write cache mode flag 115 is a flag to indicate whether or not a write cache mode is set to the relevant logical device. Both the read cache mode flag 114 and the write cache mode flag 115 will have a value of either "ON" or "OFF."

If the read cache mode flag 114 is "ON," it means that the read cache mode is set "ON." In this case, when processing a read request from the host computer 2, read data is temporarily stored in the cache memory 42B. If the read cache mode flag 114 is "OFF," it means that the read cache mode is set "OFF." In this case, the read data will not be temporarily stored in the cache memory 42B.

Similarly, if the write cache mode flag 115 is "ON," it means that a write cache mode is set "ON." In this case, when processing a write request from the host computer 2, write data is temporarily stored in the cache memory 42A. If the write cache mode flag 115 is "OFF," it means that the write cache mode is set "OFF." In this case, the write data will not be temporarily stored in the cache memory 42B.

The virtual device management table 102 is a table for managing the virtual devices 70B in the migration destination storage apparatus 4A; and is composed of one or more virtual device management entries 116 provided corresponding to the individual virtual devices 70B in the migration destination storage apparatus 4A. A virtual device number 117 of the relevant virtual device 70B and lower storage tier identification information 118, which is identification information about a lower storage device associated with that virtual device 70B, are registered in the virtual device management entry 116. In this case, if the lower storage device associated with the virtual device 70B is the storage device 30B, the identification information about that storage device 30B is registered as the lower storage tier identification information 118; and if the lower storage device is the migration source logical unit 72A, a network address (Fibre Channel address) and LUN of that migration source logical unit 72A are registered as the lower storage tier identification information 118.

The logical device copy management table 103 is a table used by the logical device copy program 106 to manage the progress of data copying (data migration) between the migration source storage apparatus 4A and the migration destination storage apparatus 4B; and is composed of one or more logical device copy management entries 119 provided corresponding to each piece of data stored in the logical devices 71B.

Data identification information 120 about the relevant data and update status information 121 indicating an update status of that data are registered in the logical device copy management entry 119.

The cache directory 104 is information for managing data which are temporarily stored in the cache memory 42B. Since the configuration of this cache directory 104 is similar to that of the cache directory 83 for the migration source storage apparatus 4A described earlier with reference to FIG. 5, an explanation thereof has been omitted.

(1-2) Data Migration Processing in this Computer System (1-2-1) Outline of Data Migration Processing in this Computer System Next, an outline of data migration processing, which is executed in the computer system 1 when replacing the migration source storage apparatus 4A with the migration destination storage apparatus 4B, for migrating data stored in the migration source storage apparatus 4A to the migration destination storage apparatus 4B will be explained.

The data migration processing according to this embodiment includes the following two steps: access target migration processing for migrating an access target of the host computer 2 from the migration source logical unit 72A in the migration source storage apparatus 4A to the migration destination logical unit 72B in the migration destination storage apparatus 4B; and data copy processing for copying data, which is stored in the migration source logical unit 72A in the migration source storage apparatus 4A, to the corresponding migration destination logical unit 72B in the migration destination storage apparatus 4B.

Figure 8:
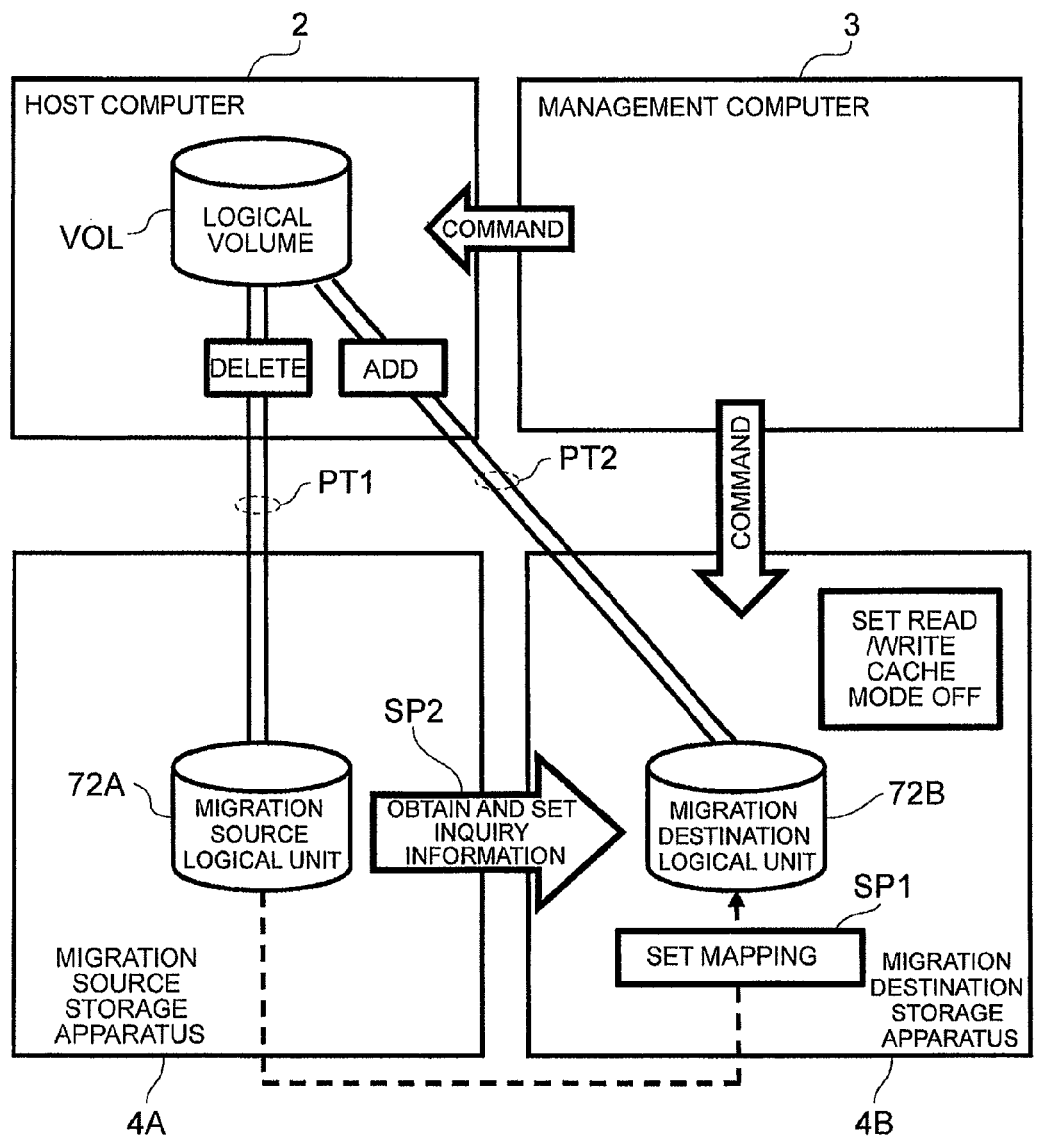
FIG. 8 is a conceptual diagram explaining access target migration processing.

FIG. 8 conceptually shows a flow of the access target migration processing. This access target migration processing is performed by each of the migration destination storage apparatus 4B and the host computer 2 executing necessary processing according to commands issued from the management computer 3 to each of the migration destination storage apparatus 4B and the host computer 2.

Actually, in accordance with a command issued by the management computer 3, the migration destination storage apparatus 4B firstly prepares for switching a logical unit related to a logical volume VOL in the host computer 2 from the migration source logical unit 72A to the migration destination logical unit 72B. Specifically speaking, the migration destination storage apparatus 4B maps the migration source logical unit 72A as an external volume to the migration destination logical unit 72B (SP1). As a result of this processing, the migration source logical unit 72A is virtualized as the migration destination logical unit 72B, so that the host computer 2 can read data from, or write data to, the migration source logical unit 72A via the migration destination storage apparatus 4B.

Next, after the migration destination storage apparatus 4B issues an Inquiry request to the migration source storage apparatus 4A, it obtains Inquiry information about the relevant migration source logical unit and sets the obtained Inquiry information as the Inquiry information about the migration destination logical unit 72B to which that migration source logical unit 72A is mapped (SP2).

As a result of this step SP2, when the host computer 2 adds a path PT2 to the migration destination logical unit 72B as a path related to the logical volume VOL, it is possible to have the host computer 2 recognize the path PT1 to the migration source logical unit 72A and the path PT2 to the migration destination logical unit 72B as an alternate path to the same logical volume VOL.

Furthermore, by setting the Inquiry information about the migration source logical unit 72A to the Inquiry information about the migration destination logical unit 72B, when the host computer 2 then deletes the path PT1 from the logical volume VOL to the migration source logical unit 72A as described later, all the read requests and the write requests for the logical volume VOL will be sent to the migration destination storage apparatus 4B and read processing and write processing in response to the read requests and the write requests will be executed by the migration destination storage apparatus 4B. When this happens, the host computer 2 still recognizes the read requests and the write requests as being issued to the migration source storage apparatus 4A and, therefore, data input/output processing executed by the host computer 2 will not stop.

Subsequently, the management computer 3 commands the host computer 2, to add the path PT2 as an alternate path of logical volume VOL and to delete the path PT1 to the migration source logical unit 72A from the alternate path of the logical volume VOL. As a result of this processing, it is possible to migrate the logical unit related to the logical volume VOL from the migration source logical unit 72A to the migration destination logical unit 72B without stopping data transmission or reception.

As a result of the above-described processing, the access target of the host computer 2 can be switched from the migration source logical unit 72A to the migration destination logical unit 72B. However, in the present state, if a read request or a write request from the host computer 2 is issued to the migration destination storage apparatus 4B during a period of time after the path PT2 from the logical volume VOL to the migration destination logical unit 72B is added to the host computer 2 until the path PT1 from the logical volume VOL to the migration source logical unit 72A is deleted, data integrity between the migration source storage apparatus 4A and the migration destination storage apparatus 4B cannot be maintained.

This is because if the read cache mode and the write cache mode of the logical device 71B associated with the logical device 71B are set "ON" in the migration destination storage apparatus 4B, the migration destination storage apparatus 4B might respond to the read request or the write request from the host computer 2, using old data stored in the cache memory 42B.

In other words, if the host computer 2 adds the path PT2 to the migration destination logical unit 72B as a path from the logical volume VOL to the logical unit, the host computer 2 will use either the path PT1 to the migration source logical unit 72A or the path PT2 to the migration destination logical unit 72B to issue a read request and a write request which target the migration source logical unit 72A associated with the logical volume VOL.

So, for example, when the host computer 2 updates data stored in the migration source logical unit 72A via the path PT1 to the migration source logical unit 72A and then issues a read request to the migration destination storage apparatus 4B to read that data via the path PT2, and if the read cache mode of the corresponding logical device 71B in the migration destination storage apparatus 4B is set "ON" and a pre-update version of the relevant data exists in the cache memory 42B for the migration destination storage apparatus 4B, the pre-update version of the data will be read from the cache memory 42B for the migration destination storage apparatus 4B and sent to the host computer 2.

Also, if the write cache mode of the corresponding logical device 71B in the migration destination storage apparatus 4B is set "ON" and the host computer 2 sends a write request and writes data to the migration destination storage apparatus 4B via the path PT2 to the migration destination logical unit 72B, the write data will be stored in the cache memory 42B for the migration destination storage apparatus 4B and then transferred to the migration source storage apparatus 4A. Therefore, if the host computer sends a read request for that data to the migration source storage apparatus 4A via the path PT1 to the migration source logical unit 72A before the write data is transferred from the migration destination storage apparatus 4B to the migration source storage apparatus 4A, the pre-update version of the relevant data will be read from the migration source storage apparatus 4A and sent to the host computer 2.

So, in the case of this computer system 1, the management computer 3 commands the migration destination storage apparatus 4B to set both the read cache mode and the write cache mode of the corresponding logical device 71B to "OFF" before commanding the host computer 2 to add the path PT2 to the migration destination logical unit 72B as an alternate path of the logical volume VOL. As a result, data integrity between the migration source storage apparatus 4A and the migration destination storage apparatus 4B can be secured.

Figure 9:
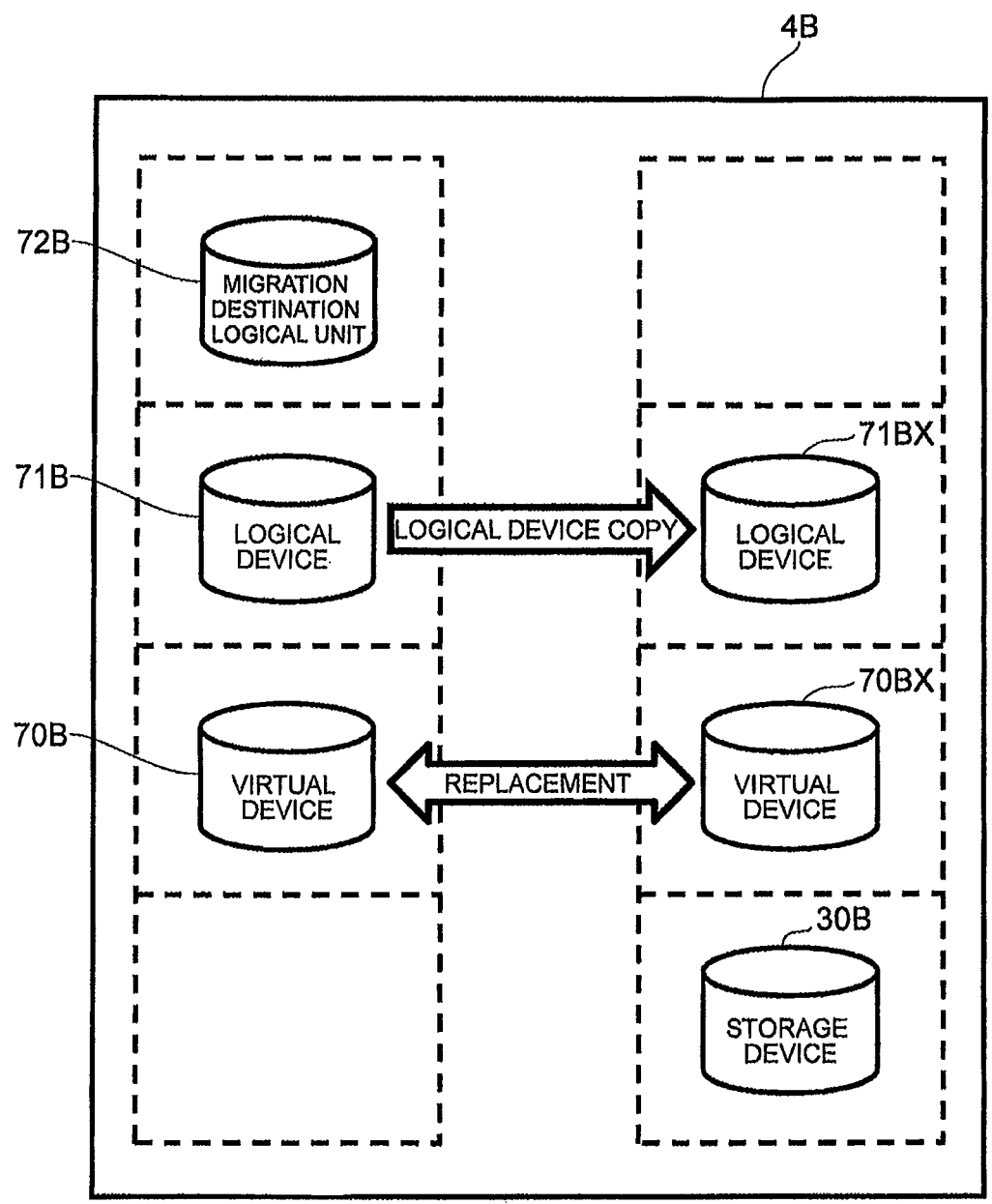
FIG. 9 is a conceptual diagram explaining data copy processing.

Meanwhile, FIG. 9 conceptually shows a flow of the data copy processing in the data migration processing. This data copy processing is performed by the migration destination storage apparatus 4B executing necessary processing in accordance with commands issued from the management computer 3 to the migration destination storage apparatus 4B.

Actually, according to a command from the management computer 3, the migration destination storage apparatus 4B creates a new virtual device 70BX associated with the storage device 30B and also creates a new logical device 71BX associated with the new virtual device 70BX.

Next, the migration destination storage apparatus 4B copies data from the logical device 71B to the new logical device 71BX and then replaces the virtual device 70B with the new virtual device 70BX, thereby associating the migration destination logical unit 72B with the storage device 30B.

As a result of the above-described processing, data stored in the logical device 71A in the migration source storage apparatus 4A is migrated to the storage device 30B in the migration destination storage apparatus 4B and then the data is read from, or written to, the storage device 30B in the migration destination storage apparatus 4B via the migration destination logical unit 72B, the new logical device 71BX, and the new virtual device 70BX.

(1-2-2) Specific Processing of Each Program

Next, the content of various processing relating to the data migration processing according to this embodiment will be explained in more detail with reference to FIG. 10 through FIG. 19. It should be noted that processing subjects of various processing will be described as "programs" in the following explanation; however, in fact, it is a matter of course that the CPU 10, 20, 40A, 40B for the host computer 2, the management computer 3, the migration source storage apparatus 4A, or the migration destination storage apparatus 4B executes the processing based on the "programs."

(1-2-2-1) Data Migration Control Processing

Figure 10:
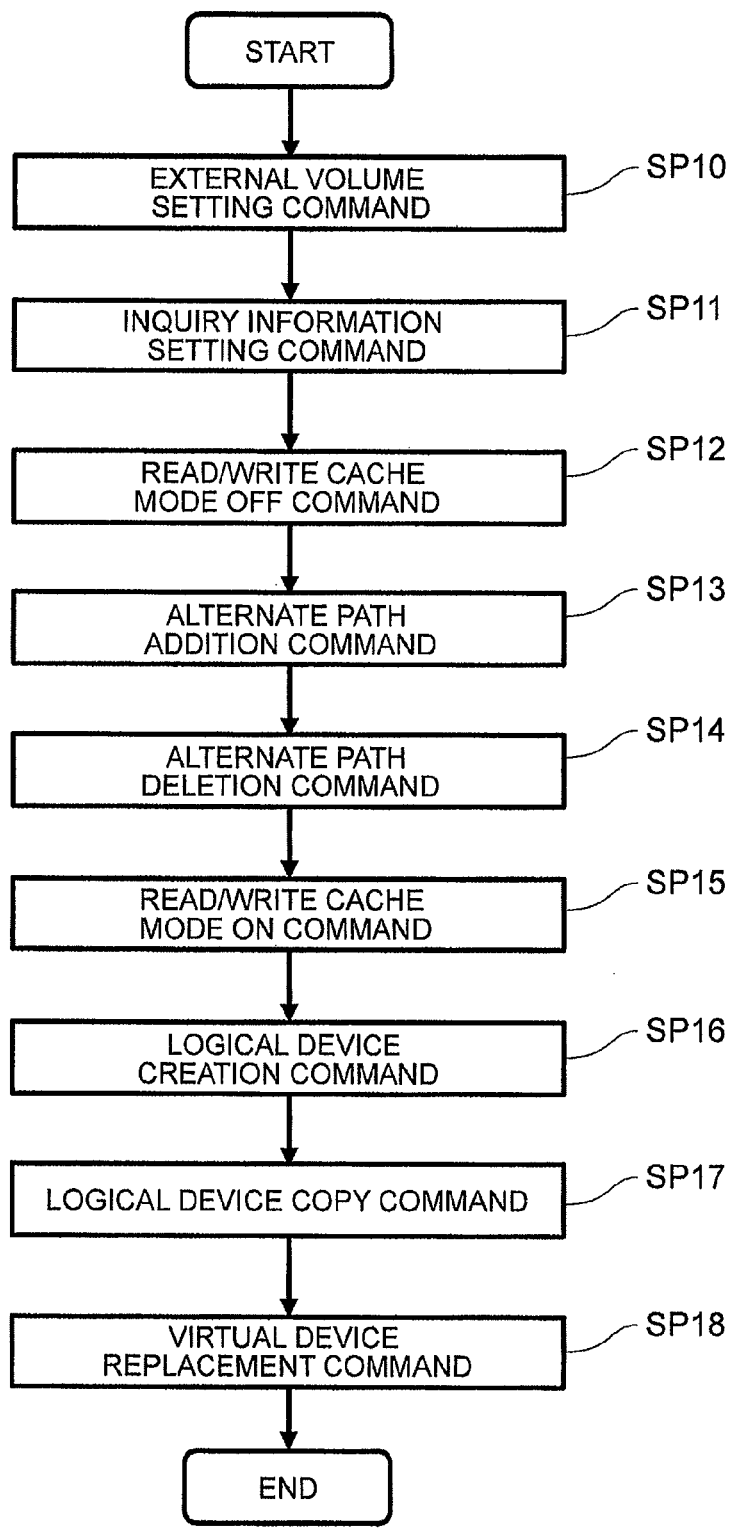
FIG. 10 is a flowchart illustrating a processing sequence for data migration control processing.

FIG. 10 shows a processing sequence for data migration control processing executed by the logical unit migration command program 60 (FIG. 3) stored in the memory 21 for the management computer 3 in relation to the aforementioned data migration processing according to this embodiment.

The logical unit migration command program 60 starts the data migration control processing shown in FIG. 10 as designated by the system administrator through the input device 23 for the management computer 3 to execute data migration from the migration source storage apparatus 4A to the migration destination storage apparatus 4B, and firstly commands the migration destination storage apparatus 4B to map one or more migration source logical units 72A as external volumes designated by the system administrator to different migration destination logical units 72B, each of which is designated by the system administrator (hereinafter referred to as the "external volume setting command") (SP10).

Thus, the migration destination storage apparatus 4B executes external volume setting processing for mapping each migration source logical unit 72A designated by the system administrator as the external volume to each migration destination logical unit 72B designated by the system administrator according to the external volume setting command. After the completion of this external volume setting processing, the migration destination storage apparatus 4B sends an external volume setting processing completion notice to the management computer 3.

After receiving the external volume setting processing completion notice, the logical unit migration command program 60 for the management computer 3 commands the migration destination storage apparatus 4B to set the Inquiry information about each migration source logical unit 72A as Inquiry information about each corresponding migration destination logical unit 72B (hereinafter referred to as the "Inquiry information setting command") (SP11).

Thus, the migration destination storage apparatus 4B executes Inquiry information setting processing for setting the Inquiry information about each migration source logical unit 72A as Inquiry information about the corresponding migration destination logical unit 72B according to the Inquiry information setting command. After the completion of this Inquiry information setting processing, the migration destination storage apparatus 4B sends an Inquiry information setting processing completion notice to the management computer 3.

Then, after receiving the Inquiry information setting processing completion notice, the logical unit migration command program 60 for the management computer 3 gives a command to the migration destination storage apparatus 4B to set both the read cache mode and the write cache mode of each migration destination logical unit 72B to "OFF" (hereinafter referred to as the "cache mode off command") (SP12).

Thus, the migration destination storage apparatus 4B executes cache mode off processing for setting both the read cache mode and the write cache mode of each migration destination logical unit 72B to "OFF" according to this cache mode off command. After the completion of this cache mode off processing, the migration destination storage apparatus 4B sends a cache mode off processing completion notice to the management computer 3.

After receiving the cache mode off processing completion notice, the logical unit migration command program 60 for the management computer 3 commands the host computer 2 to add the path PT2 to each migration destination logical unit 72B (FIG. 8) as an alternate path to each corresponding logical volume VOL (hereinafter referred to as the "alternate path addition command") (SP13).

Thus, the host computer 2 executes alternate path addition processing for adding the path PT2 to each migration destination logical unit 72B as an alternate path to each corresponding logical volume VOL according to this alternate path addition command. After the completion of this alternate path addition processing, the host computer 2 sends an alternate path addition processing completion notice to the management computer 3.

After the completion of addition of the alternate path as described above, the alternate path program 51 for the host computer 2 can issue a read request or a write request for the logical volume VOL not only to the migration source logical unit 72A, but also to its corresponding migration destination logical unit 72B. Specifically speaking, the alternate path program 51 randomly selects one path number from among a plurality of path numbers included in the path management entry 53 (FIG. 2) associated with the logical volume VOL and then issues a read request or a write request, using the path PT1 or the path PT2 with the selected path number.

When this happens, the read cache mode and the write cache mode of each logical device 71B associated with each migration destination logical unit 72B are set "OFF". So, data integrity between the logical devices 71A in the migration source storage apparatus 4A and the logical devices 71B in the migration destination storage apparatus 4B is maintained.

Meanwhile, after receiving the alternate path addition processing completion notice, the logical unit migration command program 60 for the management computer 3 commands the host computer 2 to delete the path PT1 to the migration source logical unit 72A (FIG. 8) from the alternate paths of the logical volume VOL (hereinafter referred to as the "alternate path deletion command") (SP14).

Thus, the host computer 2 executes alternate path deletion processing for deleting the path PT1 to the migration source logical unit 72A (FIG. 8) from the alternate paths of the logical volume VOL according to this alternate path deletion command. After the completion of this alternate path deletion processing, the host computer 2 sends an alternate path deletion processing completion notice to the management computer 3.

After receiving the alternate path deletion processing completion notice, the logical unit migration command program 60 for the management computer 3 commands the migration destination storage apparatus 4B to set both the read cache mode and the write cache mode of the logical device 71B associated with the relevant migration destination logical unit 72B to "ON" (hereinafter referred to as the "cache mode on command") (SP15).

Thus, the migration destination storage apparatus 4B executes cache mode on processing for setting both the read cache mode and the write cache mode of the logical device 71B associated with the relevant migration destination logical unit 72B to "ON" according to this cache mode on command. After the completion of this cache mode on processing, the migration destination storage apparatus 4B sends a cache mode on processing completion notice to the management computer 3.

After receiving the cache mode on processing completion notice, the logical unit migration command program 60 for the management computer 3 commands the migration destination storage apparatus 4B to create a new logical device 71BX (FIG. 9) for each logical device 71B whose both the read cache mode and write cache mode are set "ON" as described above (hereinafter referred to as the "logical device creation command") (SP16).

Thus, the migration destination storage apparatus 4B executes logical device creation processing for creating a required number of new logical devices 71BX according to this logical device creation command. After the completion of this logical device creation processing, the migration destination storage apparatus 4B sends a logical device creation processing completion notice to the management computer 3.

Then, after receiving the logical device creation processing completion notice, the logical unit migration command program 60 for the management computer 3 commands the migration destination storage apparatus 4B to copy data stored in the logical devices 71B associated with the migration destination logical units 72B respectively to the corresponding new logical devices 71BX created in the migration destination storage apparatus 4B according to the logical device creation command in step SP16 (hereinafter referred to as the "logical device copy command") (SP17).

Thus, the migration destination storage apparatus 4B executes logical device copy processing for copying each piece of data stored in each logical device 71B in the migration source storage apparatus 4A to each corresponding new logical device 71BX according to the logical device copy command. After the completion of this logical device copy processing, the migration destination storage apparatus 4B sends a logical device copy processing completion notice to the management computer 3.

After receiving the logical device copy processing completion notice, the logical unit migration command program 60 for the management computer 3 commands the migration destination storage apparatus 4B to use the new virtual devices 70BX, which are associated with the new logical devices 71BX respectively, to replace the corresponding virtual devices 70B associated with the migration destination logical units 72B respectively (hereinafter referred to as the "virtual device replacement command") (SP18).

Thus, the migration destination storage apparatus 4B executes virtual device replacement processing on the migration destination storage apparatus 4B for replacing the virtual device 70B, which is associated with the migration destination logical unit 72B, with the corresponding new virtual device 70BX according to the virtual device replacement command. According to the completion of this virtual device replacement processing, the migration destination storage apparatus 4B sends a virtual device replacement processing completion notice to the management computer 3.

After receiving this virtual device replacement processing completion notice, the logical unit migration command program 60 for the management computer 3 terminates this series of data migration control processing.

(1-2-2-2) External Volume Setting Processing

Figure 11:
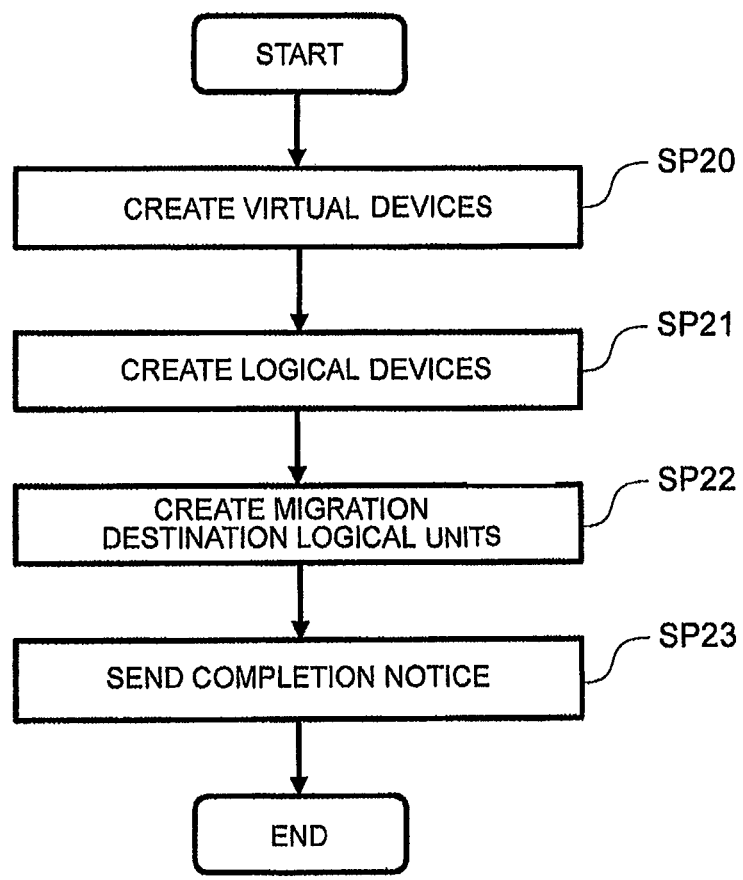
FIG. 11 is a flowchart illustrating a processing sequence for external volume setting processing.

FIG. 11 shows a processing sequence for the aforementioned external volume setting processing executed by the storage tier management program 105 for the migration destination storage apparatus 4B which received the external volume setting command sent from the logical unit migration command program 60 for the management computer 3 in step SP10 of the data migration control processing (FIG. 10).

After receiving the external volume setting command, the storage tier management program 105 starts the external volume setting processing shown in FIG. 11 and firstly creates a required number of new virtual devices 70B by adding a required number of virtual device management entries 116 to the virtual device management table 102 (SP20). When performing this step, the storage tier management program 105 registers unused, different virtual device numbers, as the virtual device numbers 117 of these virtual devices 70B, in their virtual device management entries 116 and also registers Fibre Channel addresses and LUNs of the corresponding migration source logical units 72A, as the lower storage tier identification information 118 about the virtual devices 70B, in their virtual device management entries 116.

Subsequently, the storage tier management program 105 creates a required number of new logical devices 71B by adding a required number of the logical device management entries 111 to the logical device management table 101 (SP21). When performing this step, the storage tier management program 105 registers unused logical device numbers, as the logical device numbers 112 of these logical devices 71B, in their logical device management entries 111 and also registers the virtual device numbers 117, which are registered in the corresponding virtual device management entries 116 added to the virtual device management table 102 in step SP20, as the virtual device numbers 113 in the logical device management entries 111.

Next, the storage tier management program 105 creates a required number of new migration destination logical units 72B by adding a required number of the logical unit management entries 107 to the logical unit management table 100 (SP22). When performing this step, the storage tier management program 105 registers unused LUNs, as the LUNs 108 of the newly created migration destination logical units 72B, in the logical unit management entries 107 and also registers the logical device numbers 112, which are registered in the corresponding logical device management entries 111 added to the logical device management table 101 in step SP21, as the logical device numbers 109 in the logical unit management entries 107.

Furthermore, the storage tier management program 105 sends an external volume setting processing completion notice to the management computer 3 (SP23) and then terminates this external volume setting processing.

(1-2-2-3) Inquiry Information Setting Processing

Figure 12:
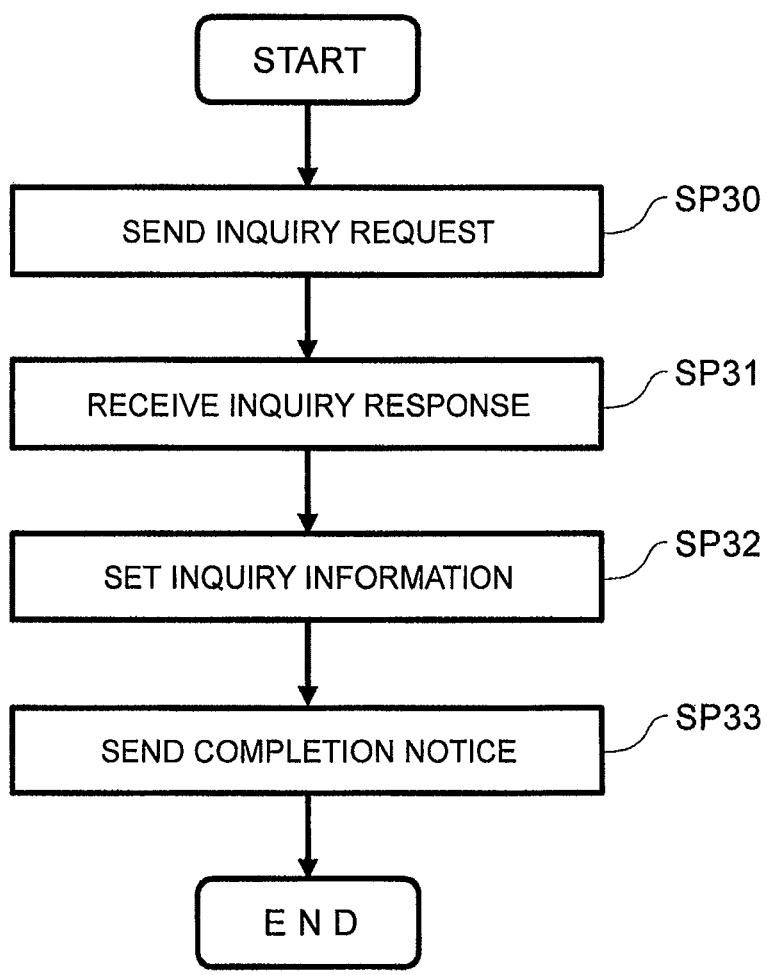
FIG. 12 is a flowchart illustrating a processing sequence for Inquiry information setting processing.

Meanwhile, FIG. 12 shows a processing sequence for Inquiry information setting processing executed by the storage tier management program 105 for the migration destination storage apparatus 4B which received the Inquiry information setting command sent from the logical unit migration command program 60 for the management computer 3 in step SP11 of the data migration control processing (FIG. 10).

After receiving the Inquiry information setting command, the storage tier management program 105 starts the Inquiry information setting processing shown in FIG. 12 and firstly sends an Inquiry request, which is a request to transfer the Inquiry information about each migration source logical unit 72A, to the migration source storage apparatus 4A (SP30).

After receiving the Inquiry information about each migration source logical unit 72A which was transferred from the migration destination storage apparatus 4B in response to the Inquiry request (SP31), the storage tier management program 105 sets the received Inquiry information as the Inquiry information about the corresponding migration destination logical unit 72B (SP32). Specifically speaking, the storage tier management program 105 registers the received Inquiry information about the migration source logical unit 72A, as the Inquiry information 110 about the relevant migration destination logical unit 72B, in the logical unit management entry 107 of the corresponding migration destination logical unit 72B in the logical unit management table 100 (FIG. 7).

Next, the storage tier management program 105 sends an Inquiry information setting processing completion notice to the management computer 3 (SP33) and then terminates this Inquiry information setting processing.

(1-2-2-4) Cache Mode Off Processing

Figure 13:
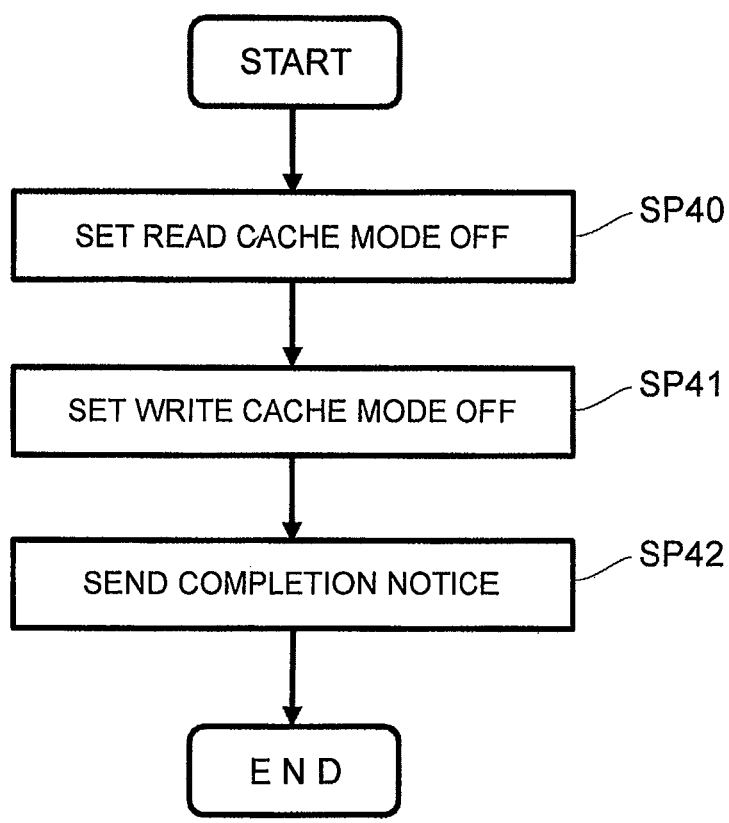
FIG. 13 is a flowchart illustrating a processing sequence for cache mode off processing.

FIG. 13 shows a processing sequence for the cache mode off processing executed by the storage tier management program 105 for the migration destination storage apparatus 4B which received the cache mode off command sent from the logical unit migration command program 60 for the management computer 3 in step SP12 of the data migration control processing (FIG. 10).

After receiving the cache mode off command, the storage tier management program 105 starts the cache mode off processing shown in FIG. 13 and firstly sets the read cache mode of each logical device 71B corresponding to each migration destination logical unit 72B designated by the cache mode off command to "OFF" (SP40). Specifically speaking, the storage tier management program 105 sets each read cache mode flag 114 of the logical device management entry 111 for each logical device 71B associated with each migration destination logical unit 72B designated by the cache mode off command, from among the logical device management entries 111 constituting the logical device management table 101 (FIG. 7), to "OFF."

Subsequently, the storage tier management program 105 sets the write cache mode of each logical device 71B corresponding to each relevant migration destination logical unit 72B to "OFF" (SP41). Specifically speaking, the storage tier management program 105 sets the write cache mode flag 115 of each relevant logical device management entry 111 to "OFF."

Next, the storage tier management program 105 sends a cache mode off processing completion notice to the management computer 3 (SP42) and then terminates this cache mode off processing.

(1-2-2-5) Alternate Path Addition Processing

Figure 14:
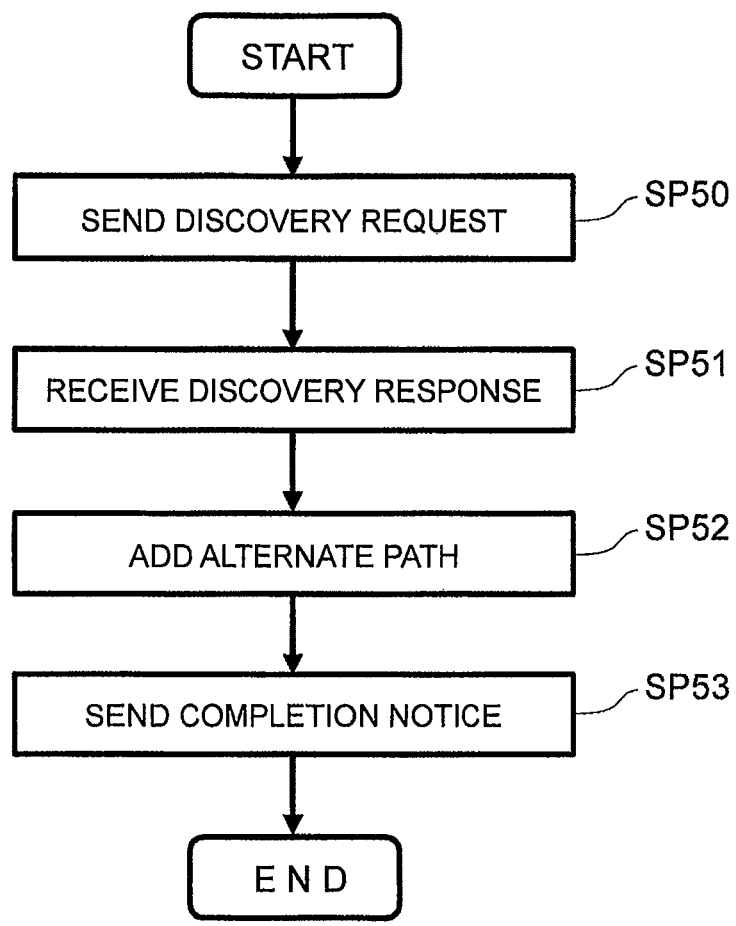
FIG. 14 is a flowchart illustrating a processing sequence for alternate path addition processing.

FIG. 14 shows a processing sequence for the alternate path addition processing executed by the alternate path program 51 for the host computer 2 (FIG. 2) which received the alternate path addition command sent from the logical unit migration command program 60 for the management computer 3 in step SP13 of the data migration control processing (FIG. 10).

After receiving the alternate path addition command, the alternate path program 51 starts the alternate path addition processing shown in FIG. 14 and firstly sends a discovery request to the migration destination storage apparatus 4B to request a list of the migration destination logical units 72B provided by the migration destination storage apparatus 4B to the host computer 2 (hereinafter referred to as the "migration destination logical unit list") (SP50).

After receiving the migration destination logical unit list which was sent from the migration destination storage apparatus 4B in response to the discovery request (SP51), the alternate path program 51 adds the path PT2 to each migration destination logical unit 72B as an alternate path of the corresponding logical volume VOL based on the migration destination logical unit list (SP52). Specifically speaking, the alternate path program 51 adds and registers the path number 55 (FIG. 2) of the path 2 to each corresponding migration destination logical unit 72B to the path management entry 53 (FIG. 2) corresponding to each logical volume VOL in the path management table 50 (FIG. 2).

Next, the alternate path program 51 sends an alternate path addition processing completion notice to the management computer 3 (SP53) and then terminates this alternate path addition processing.

(1-2-2-6) Alternate Path Deletion Processing

Figure 15:
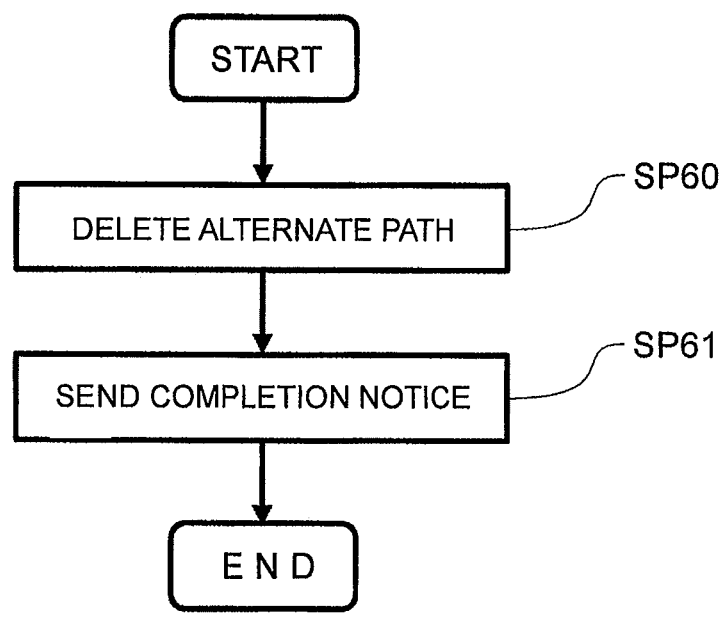
FIG. 15 is a flowchart illustrating a processing sequence for alternate path deletion processing.

FIG. 15 shows a processing sequence for the alternate path deletion processing executed by the alternate path program 51 for the host computer 2 which received the alternate path deletion command sent from the logical unit migration command program 60 for the management computer 3 in step SP14 of the data migration control processing (FIG. 10).

After receiving the alternate path deletion command, the alternate path program 51 deletes each path PT1 (FIG. 8) connecting the logical volume VOL and the migration source logical unit 72A in the migration source storage apparatus 4A from the alternate paths of the relevant logical volume VOL (SP60). Specifically speaking, the alternate path program 51 deletes the path number 55 (FIG. 2) of the path PT1 from the path management entry 53 (FIG. 2) corresponding to the logical volume VOL in the path management table 50 (FIG. 2).

Next, the alternate path program 51 sends an alternate path deletion processing completion notice to the management computer 3 (SP61) and then terminates this alternate path deletion processing.

As a result of the alternate path deletion processing, the only path connected to the logical volume VOL is the path PT2 (FIG. 8) to the corresponding migration destination logical unit 72B. Therefore, the alternate path program 51 will thereafter send a read request and a write request for the logical volume VOL only to the corresponding migration destination logical unit 72B.

(1-2-2-7) Cache Mode on Processing

Figure 16:
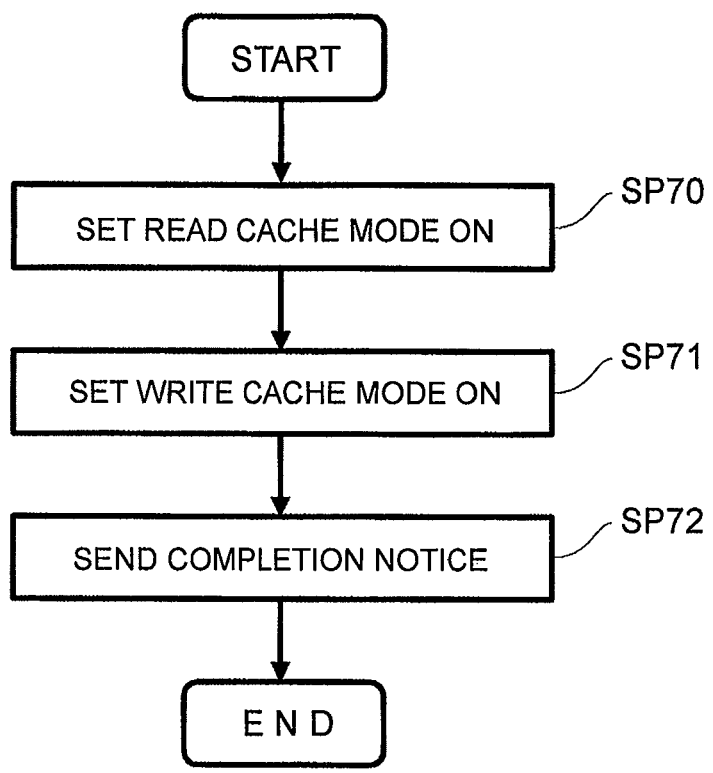
FIG. 16 is a flowchart illustrating a processing sequence for cache mode on setting processing.

FIG. 16 shows a processing sequence for the cache mode on processing executed by the storage tier management program 105 for the migration destination storage apparatus 4B which received the cache mode on command sent from the logical unit migration command program 60 for the management computer 3 in step SP15 of the data migration control processing (FIG. 10).

After receiving the cache mode on command, the storage tier management program 105 starts the cache mode on processing shown in FIG. 16 and firstly sets the read cache mode of each migration destination logical unit 72B designated by the cache mode on command to "ON" (SP70). Specifically speaking, the storage tier management program 105 sets the read cache mode flag 114 (FIG. 7) of each logical device management entry 111 corresponding to each migration source logical unit 72B designated by the cache mode on command, from among the logical device management entries 111 constituting the logical device management table 101 (FIG. 7), to "ON."

Subsequently, the storage tier management program 105 sets the write cache mode of each relevant migration source logical unit 72B to "ON" (SP71). Specifically speaking, the storage tier management program 105 sets the write cache mode flag 115 (FIG. 7) of each logical device management entry 111 described above to "ON."

Furthermore, the storage tier management program 105 sends a cache mode on processing completion notice to the management computer 3 and then terminates this cache mode on processing (SP72).

(1-2-2-8) Logical Device Creation Processing

Figure 17:
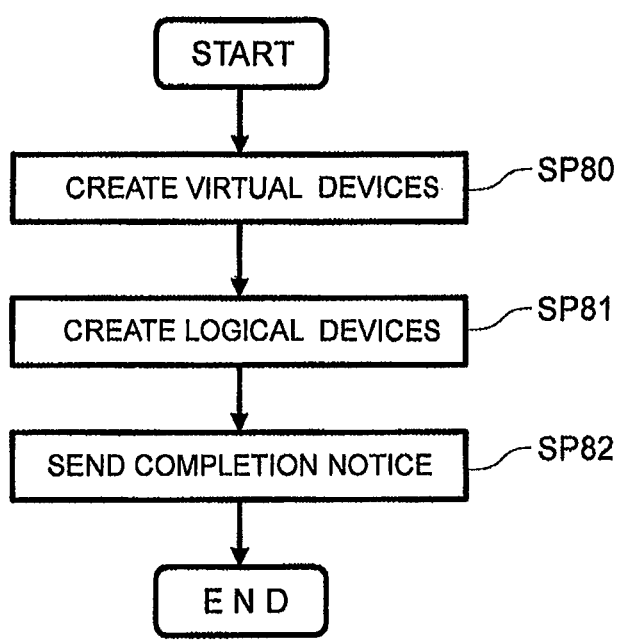
FIG. 17 is a flowchart illustrating a processing sequence for logical device creation processing.

FIG. 17 shows a processing sequence for the logical device creation processing executed by the storage tier management program 105 for the migration destination storage apparatus 4B which received the logical device creation command sent from the logical unit migration command program 60 for the management computer 3 in step SP16 of the data migration control processing (FIG. 10).

After receiving the logical device creation command, the storage tier management program 105 starts the logical device creation processing shown in FIG. 17 and firstly creates a required number of new virtual devices 70BX (FIG. 9) by adding a required number of virtual device management entries 116 to the virtual device management table 102 (FIG. 7) (SP80). When performing this step, the storage tier management program 105 registers unused virtual device numbers, as the virtual device numbers 117 (FIG. 7) of the newly created virtual devices 70BX, in the corresponding virtual device management entries 116 and also registers identification information about the corresponding storage devices 30B as the lower storage tier identification information 118.

Subsequently, the storage tier management program 105 creates a required number of new logical devices 71BX (FIG. 9) by adding a required number of the logical device management entries 111 to the logical device management table 101 (SP81). When performing this step, the storage tier management program 105 registers unused logical device numbers, as the logical device numbers 112 (FIG. 7) of the newly created logical devices 71BX, in the corresponding logical device management entries 111 and also registers the virtual device numbers 117, which are registered in the corresponding virtual device management entries 116 added to the virtual device management table 102 in step SP80, as the virtual device numbers 113 (FIG. 7) of the virtual devices 70BX corresponding to the newly created logical devices 71BX, in the logical device management entries 111.

Furthermore, the storage tier management program 105 sends a logical device creation processing completion notice to the management computer 3 (SP82) and then terminates this logical device creation processing.

(1-2-2-9) Logical Device Copy Processing

Figure 18:
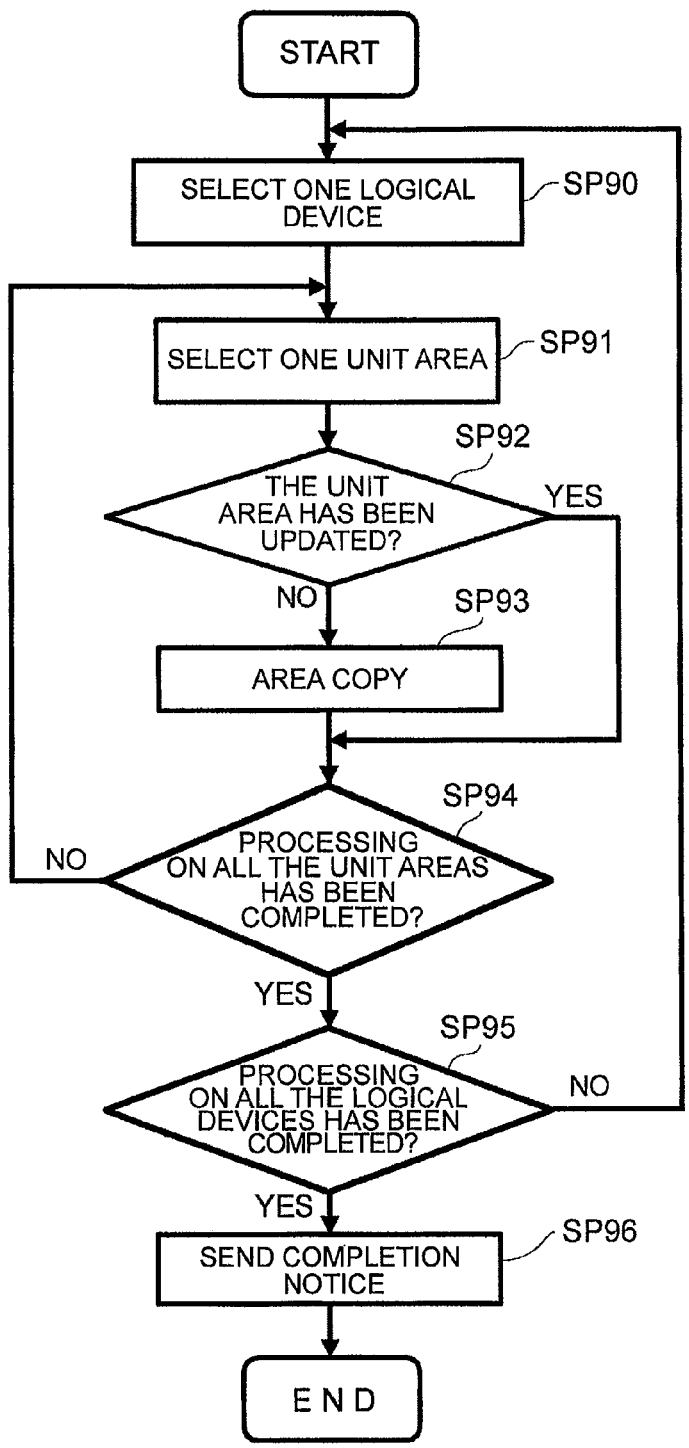
FIG. 18 is a flowchart illustrating a processing sequence for logical device copy processing.

FIG. 18 shows a processing sequence for the logical device copy processing executed by the logical device copy program 106 (FIG. 7) for the migration destination storage apparatus 4B which received the logical device copy command sent from the logical unit migration command program 60 for the management computer 3 in step SP17 of the data migration control processing (FIG. 10).

After receiving the logical device copy command, the logical device copy program 106 starts the logical device copy processing shown in FIG. 18 and firstly selects one logical device 71B from among the logical devices 71B which are copy targets designated by the logical device copy command (SP90).

Subsequently, the logical device copy program 106 selects one unit area in the logical device selected in step SP90 (SP91). Incidentally, this unit area is a storage area of the same size as that of a data write unit for the logical device 71B.

Next, the logical device copy program 106 judges whether or not the unit area selected in step SP91 has been updated (whether data has been stored) (SP92).

If an affirmative judgment is returned in this step, the logical device copy program 106 proceeds to step SP94; and if a negative judgment is returned, the logical device copy program 106 proceeds to step SP93 and copies data, which is stored in the unit area of that logical device 71B, to the corresponding logical device 71BX from among the new logical devices 71BX created in step SP81 of the logical device creation processing described earlier with reference to FIG. 17 (SP93). Specifically speaking, the logical device copy program 106 uses the external connection function to read the data, which is stored in the unit area of the logical device 71B selected in step SP90, from the migration source logical unit 72A, which is mapped to that logical device 71B in the migration source storage apparatus 4A, and stores the read data in the new logical device 71BX.

Next, the logical device copy program 106 judges whether the execution of the same processing on all the unit areas in the logical device 71B selected in step SP90 has been completed or not (SP94). If a negative judgment is returned in this step, the logical device copy program 106 returns to step SP91 and then repeats the processing from step SP91 to step SP94 while sequentially switching the unit storage area selected in step SP91 to a unit storage area which has not been processed yet.

If an affirmative judgment is returned in step SP94 by finishing the processing from step SP91 to step SP94 with respect to all the unit areas in the logical device 71B selected in step SP90, the logical device copy program 106 judges whether or not the execution of the processing from step SP91 to step SP94 has been completed with respect to all the logical devices 71B which are copy targets designated by the logical device copy command (SP95).

If a negative judgment is returned in this step, the logical device copy program 106 returns to step SP90 and then repeats the same processing while sequentially switching the logical device 71B selected in step SP90.

If an affirmative judgment is returned in step SP95 by finishing executing the processing from step SP91 to step SP94 with respect to all the logical devices 71B which are copy targets designated by the logical device copy command, the logical device copy program 106 sends a logical device copy processing completion notice to the management computer 3 (SP96) and then terminates this logical device copy processing.

Incidentally, when a write request to write data, which has been already copied to the logical device 71BX, is issued from the host computer 2 to the migration destination storage apparatus 4B during this logical device copy processing, and if the migration destination storage apparatus 4B writes the write data to the corresponding logical device 71B, this write data will be written to the corresponding migration source logical unit 72A in the migration source storage apparatus 4A, so that the data copied to the logical device 71BX will become old data.

So, if a write request targeting the migration destination logical unit 72B is issued during the logical device copy processing, the migration destination storage apparatus 4B writes write data to the logical device 71B and, at the same time, copies the write data to the logical device 71BX which is a copy destination. The migration destination storage apparatus 4B continues this update copying until the completion of the virtual device replacement processing described below.

(1-2-2-10) Virtual Device Replacement Processing

Figure 19:
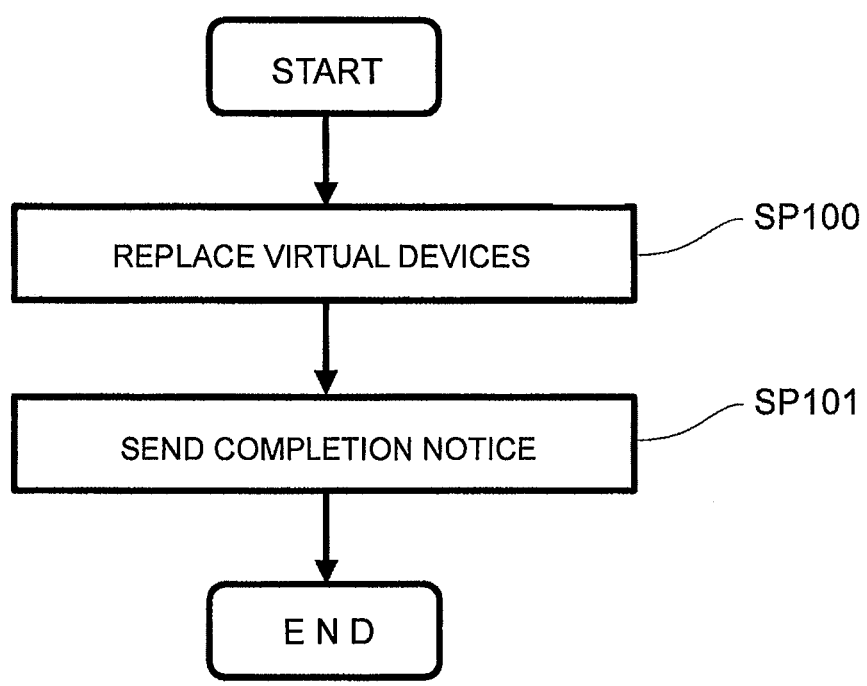
FIG. 19 is a flowchart illustrating a processing sequence for virtual device replacement processing.

FIG. 19 shows a processing sequence for the virtual device replacement processing executed by the storage tier management program 105 for the migration destination storage apparatus 4B which received the virtual device replacement command sent from the logical unit migration command program 60 for the management computer 3 in step SP18 of the data migration control processing (FIG. 10).

After receiving the virtual device replacement command, the storage tier management program 105 replaces each virtual device 70B, which is associated with each migration destination logical unit 72B, with the corresponding virtual device 70BX from among the newly created virtual devices 70BX in step SP80 of the logical device creation processing described earlier with reference to FIG. 17 (SP100).

Specifically speaking, the storage tier management program 105 replaces the virtual device number 113 (FIG. 7), which is registered in the logical device management entry 111 (FIG. 7) of the corresponding logical device 71B in the logical device management table 101 (FIG. 7), with the virtual device number 113 which is registered in the logical device management entry 111 of the corresponding logical device 71BX newly created in step SP81 of the logical device creation processing (FIG. 17). As a result of this processing, the migration source logical unit 72A which is an upper storage tier of the logical device 71B is associated with the storage device 30B which is a lower storage tier of the virtual device 70BX and then data migration to the migration destination storage apparatus 4B is completed.

Next, the storage tier management program 105 sends a virtual device replacement processing completion notice to the management computer 3 (S101) and then terminates this virtual device replacement processing.

(1-3) Input/output Processing by Migration Destination Storage Apparatus

Next, the processing of read requests and write requests by the migration destination storage apparatus 4B will be explained.

(1-3-1) Read Processing

Figure 20:
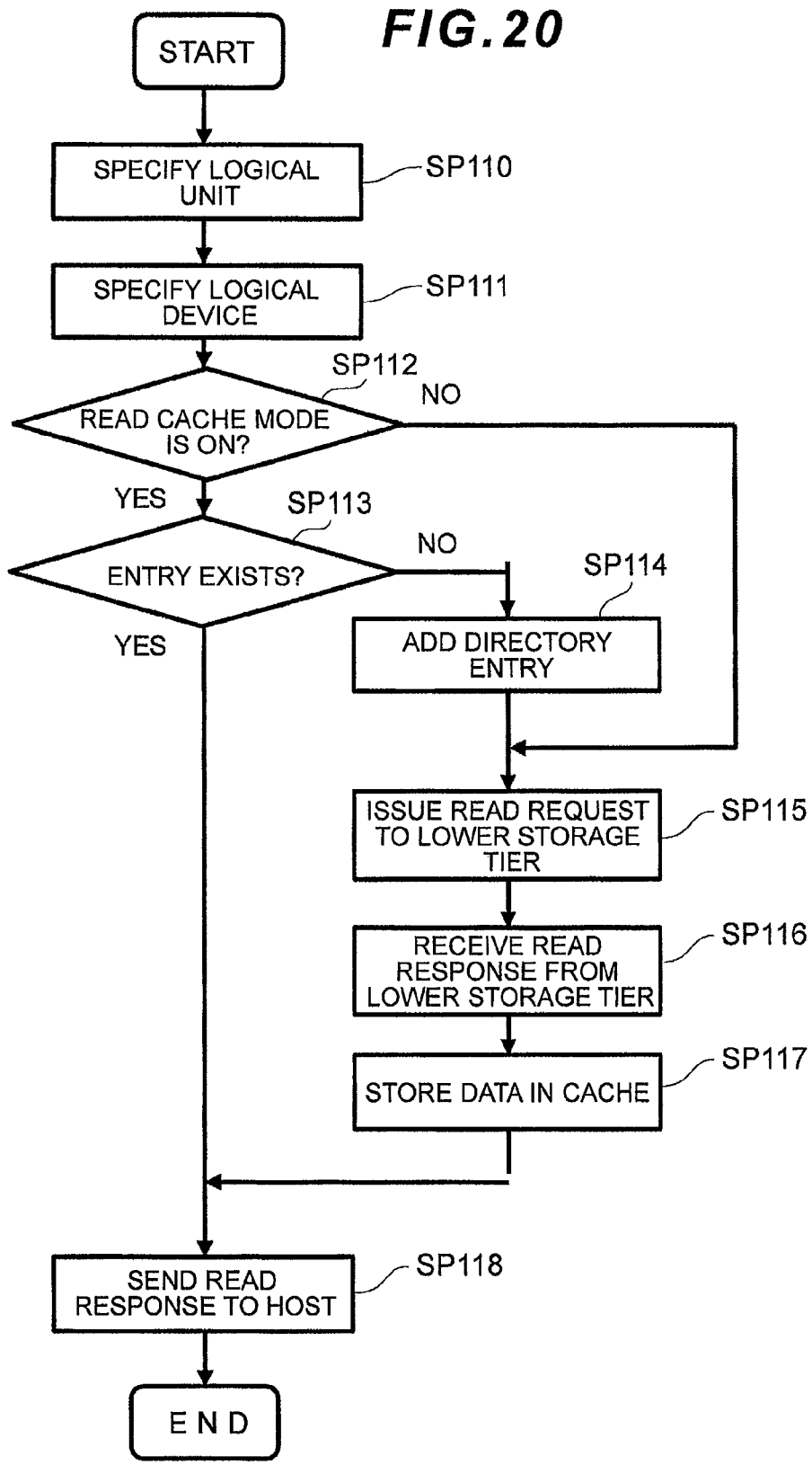
FIG. 20 is a flowchart illustrating a processing sequence for read processing.

FIG. 20 shows a processing sequence for the read processing executed by the migration destination storage apparatus 4B when receiving a read request from the host computer 2.

After receiving a read request from the host computer 2, the migration destination storage apparatus 4B starts the read processing and firstly extracts the LUN of the migration destination logical unit 72B, from which data is to be read, from the read request, refers to the logical unit management table 100 (FIG. 7), and determines the logical unit management entry 107 (FIG. 7) corresponding to the extracted LUN (SP110).

Subsequently, the migration destination storage apparatus 4B refers to the logical device management table 101 (FIG. 7) and determines the logical device management entry 111 (FIG. 7) corresponding to the logical device number 109 (FIG. 7) registered in the logical unit management entry 107 (FIG. 7) determined in step SP110 (SP111).

Next, the migration destination storage apparatus 4B refers to the logical device management table 101 and judges whether or not the read cache mode flag 114 (FIG. 7) registered in the logical device management entry 111 determined in step SP111 is set on (SP112).

If a negative judgment is returned in this step, the migration destination storage apparatus 4B proceeds to step SP115; and if an affirmative judgment is returned, the migration destination storage apparatus 4B proceeds to step SP113. Therefore, for example, if the migration destination storage apparatus 4B receives a read request for the migration destination logical unit 72B during a period of time after the read cache mode of the logical device 71B associated with the migration destination logical unit 72B is set to "OFF" and before that read cache mode is set back to "ON" during the data migration processing described above with reference to FIG. 10 through FIG. 19, the processing proceeds to step SP115; and if the migration destination storage apparatus 4B receives the read request for the migration destination logical unit 72B at a time other than that described above, the processing proceeds to step SP113.

Then, if the processing proceeds to step SP113 as the judgment result of step SP112, the migration destination storage apparatus 4B refers to the cache directory 104 and judges whether or not the directory entry 122 corresponding to read data exists in the cache directory 104 (SP113).

An affirmative judgment in this step means that the read data is stored in the cache memory 42B (FIG. 1). Thus, when this judgment is returned, the migration destination storage apparatus 4B reads the data from the cache memory 42B and sends the read data to the host computer 2 which is the sender of the read request (SP118). The migration destination storage apparatus 4B then terminates this read processing.

On the other hand, a negative judgment in step SP113 means that the read data is not stored in the cache memory 42B. Thus, when this judgment is returned, the migration destination storage apparatus 4B adds the directory entry 122 (FIG. 7) corresponding to that data to the cache directory 104 (FIG. 7) (SP114). When performing this step, the migration destination storage apparatus 4B registers the address of an unused area in the cache memory 42B, as the cache address 123 (FIG. 7), to the added directory entry 122 and also registers the data identification information which is included in the read request, as the data identification information 124, in the added directory entry 122. The migration destination storage apparatus 4B then proceeds to step SP115.

In step SP115, the migration destination storage apparatus 4B refers to the logical unit management table 100 (FIG. 7), determines the virtual device 70B corresponding to the virtual device number 113 registered in the logical device management entry 111 determined in step SP111, and determines the lower storage tier (the storage devices 30B or the migration source logical unit 72A) associated with the virtual device 70B according to the lower storage tier identification information 118 (FIG. 7) registered in the virtual device management entry 116 corresponding to the virtual device 70B. The migration destination storage apparatus 4B transfers the then received read request to the lower storage tier (SP115).

After receiving a response (read data) sent from the lower storage tier in response to the read request (SP116), the migration destination storage apparatus 4B stores the received read data in the cache memory 42B (SP117). Incidentally, in step SP117, the cache memory 42B is used just as a place to temporarily store the data and no directory entry 122 with respect to this read data is added to the cache directory 104 (FIG. 7).

Next, the migration destination storage apparatus 4B reads the data, which was stored in the cache memory 42B in step SP117, from the cache memory 42B and sends the read data to the host computer 2 which is the sender of the read request (SP118). The migration destination storage apparatus 4B then terminates this read processing.

(1-3-2) Write Processing

Figure 21:
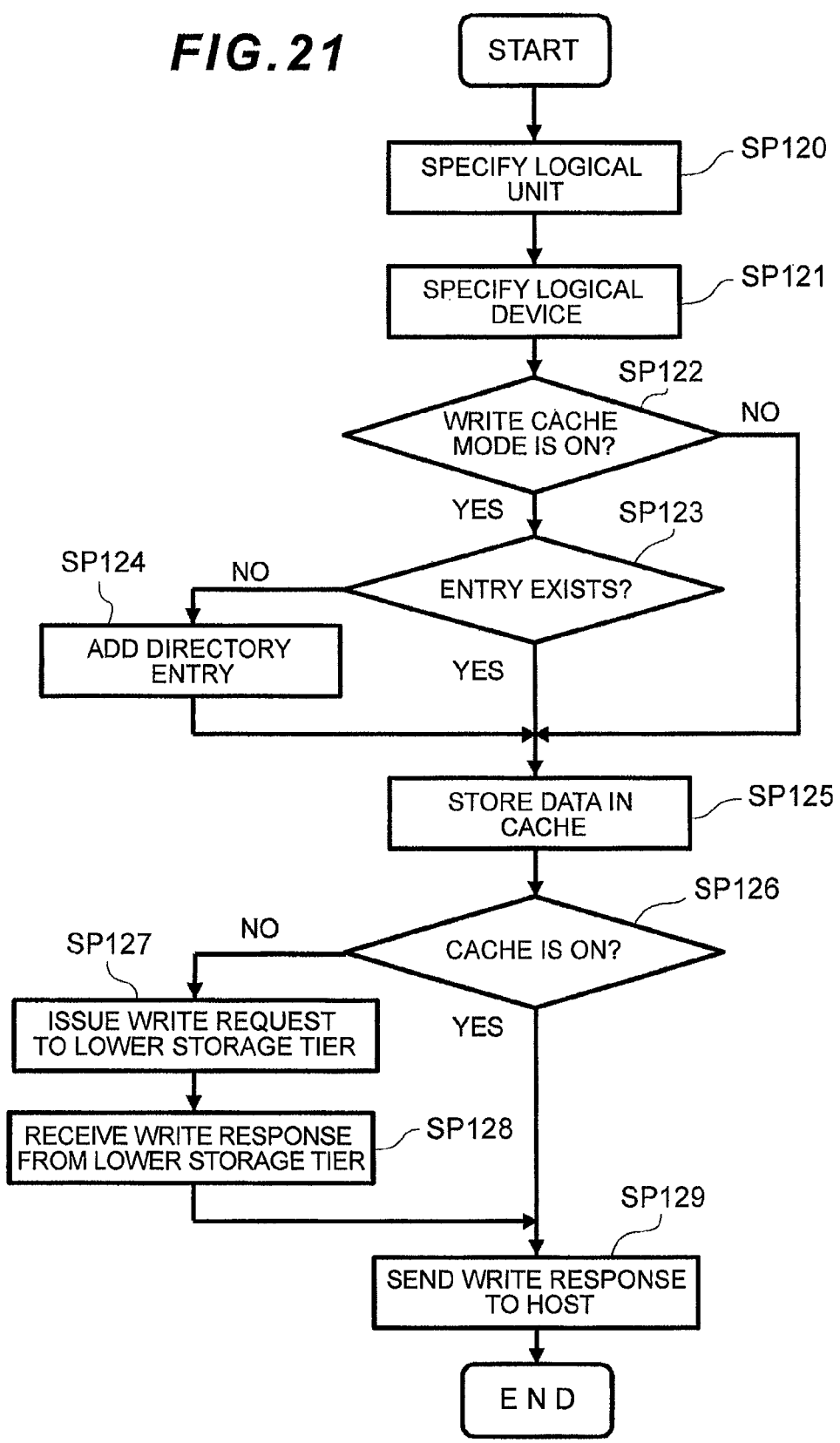
FIG. 21 is a flowchart illustrating a processing sequence for write processing.

FIG. 21 shows a processing sequence for write processing executed by the migration destination storage apparatus 4B when receiving a write request and write data from the host computer 2.

After receiving the write request and the write data from the host computer 2, the migration destination storage apparatus 4B starts the write processing shown in FIG. 21 and firstly extracts the LUN of the migration destination logical unit 72B, to which the write data is to be written, from the write request, refers to the logical unit management table 100 (FIG. 7), and determines the logical unit management entry 107 (FIG. 7) corresponding to the extracted LUN (SP120).

Subsequently, the migration destination storage apparatus 4B refers to the logical device management table 101 (FIG. 7) and determines the logical device management entry 111 (FIG. 7) corresponding to the logical device number 109 (FIG. 7) registered in the logical unit management entry 107 determined in step SP120 (SP121).

Next, the migration destination storage apparatus 4B refers to the logical device management table 101 and judges whether or not the write cache mode flag 115 (FIG. 7) registered in the logical device management entry 111 determined in step SP121 is set to "ON" (SP122).

If a negative judgment is returned in this step, the migration destination storage apparatus 4B proceeds to step SP125; and if an affirmative judgment is returned in this step, the migration destination storage apparatus 4B proceeds to step SP123. Therefore, for example, if the migration destination storage apparatus 4B receives a write request for the migration destination logical unit 72B during a period of time after the write cache mode of the logical device 71B associated with the migration destination logical unit 72B is set to "OFF" (see step SP12 in FIG. 10 and FIG. 13) until that write cache mode is set back to "ON" (see step SP15 in FIG. 10 and FIG. 16) during the data migration processing described above with reference to FIG. 10 through FIG. 19, the processing proceeds to step SP125; and if the migration destination storage apparatus 4B receives the write request for the migration destination logical unit 72B at timing other than that described above, the processing proceeds to step SP123.

Then, if the processing proceeds to step SP123 as the judgment result of step SP122, the migration destination storage apparatus 4B refers to the cache directory 104 (FIG. 7) and judges whether the directory entry 122 (FIG. 7) corresponding to the write data exists or not (SP123).

A negative judgment in this step means that pre-update write data is not stored in the cache memory 42B (FIG. 1). Thus, when this judgment is returned, the migration destination storage apparatus 4B adds the directory entry 122 corresponding to that write data to the cache directory 104 (SP124). When performing this step, the migration destination storage apparatus 4B registers the address of an unused area in the cache memory 42B, as the cache address 123, to the added directory entry 122 and also registers the data identification information which is included in the write request, as the data identification information 124, in the added directory entry 122. The migration destination storage apparatus 4B then proceeds to step SP125.

On the other hand, an affirmative judgment in step SP123 means that the pre-update write data is stored in the cache memory 42B. Thus, when this judgment is returned, the migration destination storage apparatus 4B overwrites the write data in the cache memory 42B with updated write data (SP125). Incidentally, in step SP125, the cache memory 42B is used just as a place to temporarily store the data and no directory entry 122 with respect to this write data is added to the cache directory 104.

Subsequently, the migration destination storage apparatus 4B refers to the logical device management table 101 (FIG. 7) and judges whether or not the write cache mode flag 115 (FIG. 7) registered in the logical device management entry 111 (FIG. 7) of the logical device 71B determined in step SP121 is set to "ON" (SP126).

If an affirmative judgment is returned in step SP126, the migration destination storage apparatus 4B sends a write response indicating the completion of the write processing to the host computer 2 which is the sender of the write request (SP129) and then terminates this write processing.

On the other hand, if a negative judgment is returned in step SP126, the migration destination storage apparatus 4B refers to the logical unit management table 100, determines the corresponding virtual device 70B according to the virtual device number 113 registered in the logical device management entry 111 of the logical device 71B determined in step SP121, and determines the lower storage tier (the storage device 30B or the migration source logical unit 72A) associated with the virtual device 70B according to the lower storage tier identification information 118 (FIG. 7) registered in the virtual device management entry 116 (FIG. 7) in the virtual device management table 102 (FIG. 7) corresponding to the virtual device 70B. The migration destination storage apparatus 4B then transfers the received write request and the write data to the lower storage tier (SP127).

After receiving a response (write completion notice) sent from the lower storage tier in response to the write request (SP128), the migration destination storage apparatus 4B sends a write response indicating the completion of the write processing to the host computer 2 which is the sender of the write request (SP129) and then terminates this write processing.

(1-4) Advantageous Effects of this Embodiment

With the computer system 1 according to this embodiment as described above, the migration source logical units 72A in the migration source storage apparatus 4A are mapped to the migration destination logical unit 72Bs in the migration destination storage apparatus 4B and the Inquiry information about the migration source logical units 72A are set to the migration destination logical units 72B; and meanwhile, the path PT2 from the logical volume VOL (FIG. 8) to the migration destination logical unit 72B (FIG. 8) is added to the host computer 2, the path PT1 from that logical volume VOL to the migration source logical unit 72A (FIG. 8) is deleted, and then data copy is executed between the logical devices 71A associated with the migration source logical units 72A and the logical devices 71B associated with the migration destination logical units 72B, thereby performing data migration between the migration source storage apparatus 4A and the migration destination storage apparatus 4B.

In this case, the migration source storage apparatus 4A does not require any special function when executing data migration, and can execute data migration without stopping data transmission or reception between the host computer 2 and the storage apparatus (the migration source storage apparatus 4A or the migration destination storage apparatus 4B). As a result, a computer system capable of facilitating the work to replace a storage apparatus with another storage apparatus can be realized.

(2) Second Embodiment

Referring to FIG. 1, the reference numeral 130 represents a computer system according to the second embodiment. This computer system 130 is configured in the same manner as the computer system 1 according to the first embodiment, except part of the processing content of the data migration processing is different.

Figure 22:
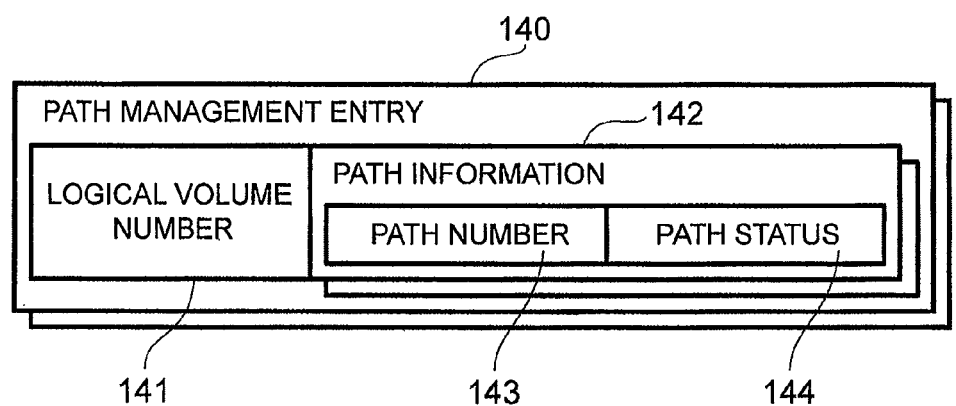
FIG. 22 is a conceptual diagram explaining a path management entry according to the second embodiment.

FIG. 22 shows the configuration of a path management entry 140 according to this embodiment. The path management entry 140 will be explained in relation to the first embodiment as follows: the logical volume number 54 of the corresponding logical volume VOL (FIG. 8), which is set in the host computer 2, and the path number 55 assigned to each path PT1, PT2 (FIG. 8) connected to that logical volume VOL are registered in the path management entry 53 according to the first embodiment described earlier with reference to FIG. 2, while a logical volume number 141 of the corresponding logical volume VOL, which is set in the host computer 2, and path information 142 about each path connected to that logical volume VOL are registered in the path management entry 140 according to this embodiment. This path information 142 is information composed of a path number 143 of each path PT1, PT2 connected to the corresponding logical volume VOL and a path status 144 of these paths PT1, PT2.

The path status 144 is information indicating the status of the relevant path PT1, PT2 and takes any of the following values: "Active," "Standby," and "Unavailable." "Active"

means that the storage device 30B, a physical device to which the relevant path PT1, PT2 is connected, is in normal operation and that storage device 30B is allocated to the logical device 71B. "Standby" means that the relevant storage device 30B is in normal operation, but the storage device 30B has not been allocated to the logical device 71B. Furthermore, "Unavailable" means that a failure has occurred in that storage device 30B and the storage device 30B is not allocated to the logical device 71B.

When processing a read request or a write request for a logical volume VOL, the alternate path program 131 (FIG. 2) for the host computer 2 refers to the corresponding path management entry 140 in the path management table 132 (FIG. 2) and selects one or more pieces of path information 142 whose path status 144 is "Active," from among a plurality of pieces of path information 142 associated with the logical volume number 141 of the relevant logical volume VOL. The alternate path program 131 then sends the read request and the write request to the migration source storage apparatus 4A or the migration destination storage apparatus 4B by using one or more paths PT1, PT2 identified by the path number 143 of the selected one or more pieces of path information 142.

If the alternate path program 131 detects a failure in the path(s) PT1, PT2 for which "Active" is registered as the path status 144, it changes the path status 144 of the path(s) PT1, PT2 to "Unavailable."

If no more path information 142 included in a certain path management entry 140, whose path status 144 is "Active," remains in the above-described case, the alternate path program 131 determines one or more pieces of path information whose path status 144 is "Standby," from among the plurality of pieces of path information 142 included in that path management entry 140 and changes the path status 144 of the determined path information 142 to "Active."

The above-described failover processing is transparent to the application programs 52 (FIG. 2); and as viewed from the application programs 52, issuance of a read request or a write request to the storage apparatuses (the migration source storage apparatus 4A and the migration destination storage apparatus 4B) will not stop.

Figure 23:
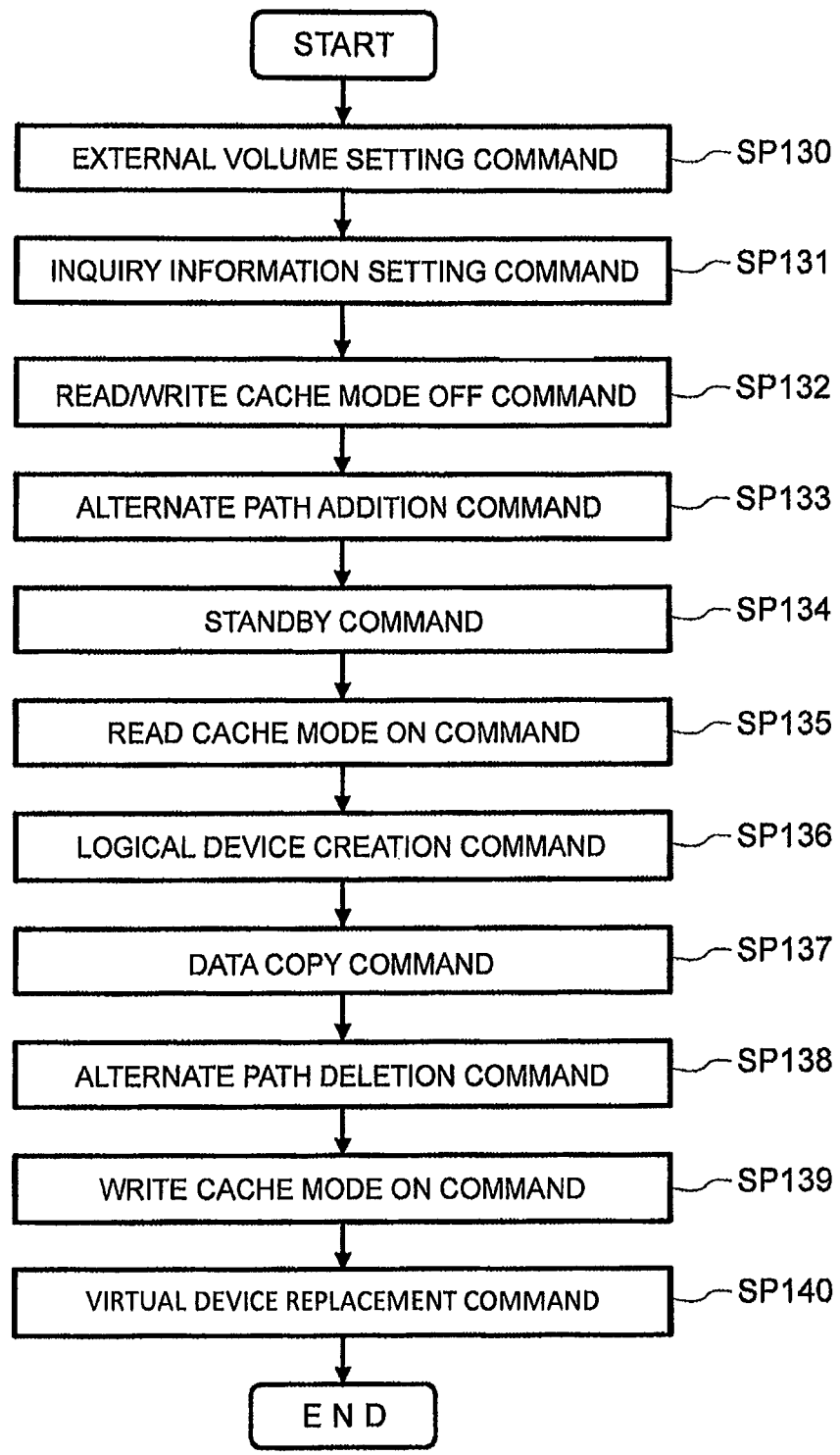
FIG. 23 is a flowchart illustrating a processing sequence for data migration control processing according to the second embodiment.

FIG. 23 shows a processing sequence for data migration control processing executed according to this embodiment by a logical unit migration command program 133 (FIG. 3) for the management computer 3 according to the second embodiment. The data migration control processing according to this embodiment will be explained in relation to the first embodiment below. The difference between the data migration control processing according to this embodiment and the data migration control processing according to the first embodiment is that after issuing an alternate path addition command, the logical unit migration command program 133 sends a Standby command instead of the alternate path deletion command to the migration destination storage apparatus, then sends a read cache on command instead of the read cache on command and the write cache on command to the migration destination storage apparatus, and further sends an alternate path deletion command and a write cache on command during a period of time after the issuance of a logical device copy command until the issuance of a virtual device replacement command.

As the alternate path deletion command corresponding to the migration source logical unit is issued after the completion of the logical device data copying in the migration destination storage apparatus, this processing has the advantage that if a failure occurs in the migration destination logical unit during the course of the data copy processing, it is possible to immediately return the path to the path corresponding to the migration source logical unit without stopping data input to, or output from, the host computer.

Furthermore, after copying the virtualized logical device in the migration source storage apparatus, the write cache mode associated with the corresponding logical device in the migration destination storage apparatus is set "ON," so that new data is stored also in the migration source logical unit until copying of the migration source logical unit in the migration destination storage apparatus is completed. Therefore, if a failure occurs in the migration destination storage apparatus before the completion of data migration from the migration source storage apparatus to the migration destination storage apparatus, this processing has the advantage that even if the path is returned to the migration source storage apparatus, data reading or writing will not be affected.

Referring back to FIG. 23, the data migration control processing according to this embodiment will be explained in more detail. After receiving a command from the system administrator via the input device 23 for the management computer 3 to execute data migration from the migration source storage apparatus 4A to the migration destination storage apparatus 4B, the logical unit migration command program 133 starts the data migration control processing shown in FIG. 23 and executes the processing from step SP130 to step SP133 in the same manner as from step SP10 to step SP13 of the data migration control processing according to the first embodiment described earlier with reference to FIG. 10.

Subsequently, the logical unit migration command program 133 gives a command to the host computer 2 to cause the status of the path PT1 corresponding to the migration source logical unit 72A make a transition to the "Standby" state (hereinafter referred to as the "Standby command") (SP134).

Thus, the host computer 2 changes the path status 144 of the path information 142 corresponding to the path PT1 in the corresponding path management entry 140 (FIG. 22) in the path management table 132 (FIG. 2) stored in the memory 11 (FIG. 1) to "Standby" in accordance with this Standby command. Also, the host computer 2 sends a "Set Target Port Groups" command specified by the SCSI standards to the migration source storage apparatus 4A, thereby notifying the migration source storage apparatus 4A that the status of the path PT1 connected to the migration source logical unit 72A has been changed to the Standby state. As a result of this processing, the status of the path PT1 corresponding to the migration source logical unit 72A makes a transition to the Standby state. After receiving a response from the migration source storage apparatus 4A to the above-described notice, the host computer 2 sends a path status update processing completion notice to the management computer 3.

After the completion of the above-described path status update processing, the alternate path program 131 uses only the path PT2 corresponding to the migration destination logical unit 72B when processing a read request or a write request for the logical volume VOL.

However, unlike the first embodiment, the path PT1 corresponding to the migration source logical unit 72A remains as an alternate path of the logical volume VOL. Therefore, the alternate path program 131 can return to the state of using path PT1 corresponding to the migration source logical unit 72A without stopping data input to, or output from, the application programs 52 (FIG. 2).

Furthermore, the alternate path program 131 can return to the state of using the path PT1 until the path PT1 connecting the logical volume VOL and the migration source logical unit 72A in the host computer 2 is deleted according to the alternate path deletion command issued by the management computer 3 in step SP138 described later. Possible examples of the situation where the alternate path program 131 returns to the state of using the path PT1 include a case where a failure occurs in the path PT2 connected to the migration destination logical unit 72B and a case where the system administrator inputs a command to, for example, the management computer 3, to stop data migration between the migration source storage apparatus 4A and the migration destination storage apparatus 4B.

Meanwhile, after receiving the path status update processing completion notice, the logical unit migration command program 133 gives a command to the migration destination storage apparatus 4B to set the read cache mode of the logical device 71B associated with the migration destination logical unit 72B to "ON" (hereinafter referred to as the "read cache mode on command") (SP135).

Thus, the migration destination storage apparatus 4B executes read cache mode on processing for changing the read cache mode flag of the logical device management entry 111 (FIG. 7) corresponding to the logical device 71B in the logical device management table 101 (FIG. 7) to "ON" according to the read cash mode on command. After the completion of this read cache mode on processing, the migration destination storage apparatus 4B sends a read cache mode on processing completion notice to the management computer 3.

In this embodiment as described above, unlike the first embodiment, the write cache mode of the corresponding logical device 71B is not set "ON" in step SP135. So, the same current data as that stored in the migration destination logical unit 72B will be stored in the migration source logical unit 72A. As a result, the alternate path program 131 can return to the state of using the path PT1 connected to the migration source logical unit 72A, while securing data integrity.

After receiving the read cache mode on processing completion notice, the logical unit migration command program 133 sequentially issues a logical device creation command (SP136) and a data copy command (SP137) to the migration destination storage apparatus 4B in the same manner as in the first embodiment (see step SP16 and step SP17 in FIG. 10), thereby creating a logical device 71B in the migration destination storage apparatus 4B and copying (migrating) data in the corresponding logical device 71A in the migration source storage apparatus 4A to the logical device 71B.

Subsequently, the logical unit migration command program 133 gives a command (alternate path deletion command) to the host computer 2 to delete the path PT1 to the migration source logical unit 72A (FIG. 8) from the alternate paths of the logical volume VOL (SP138). Thus, the host computer 2 executes alternate path deletion processing for deleting the path PT1 to the migration source logical unit 72A from the alternate paths of the logical volume VOL according to this alternate path deletion command. After the completion of this alternate path deletion processing, the host computer 2 sends an alternate path deletion processing completion notice to the management computer 3.

After receiving the alternate path deletion processing completion notice, the logical unit migration command program 133 gives a write cache mode on command to the migration destination storage apparatus 4B to set the write cache mode of the logical device 71B associated with the migration destination logical unit 72B to "ON" (SP139).

After receiving this write cache mode on command, the migration destination storage apparatus 4B executes write cache mode on setting processing for setting the write cache mode associated with the relevant logical device 71B to "ON." Furthermore, after the completion of this write cache mode on setting processing, the migration destination storage apparatus sends a write cache mode on setting processing completion notice to the management computer 3.

After receiving the write cache mode on setting processing completion notice, the logical unit migration command program 133 gives a command (virtual device replacement command) to the migration destination storage apparatus 4B to use each new virtual device 70BX, which is associated with the virtual new logical device 71BX, to replace each virtual device 70B associated with the corresponding migration destination logical unit 72B (SP140). Incidentally, the content of the processing executed by the migration destination storage apparatus 4B which received this virtual device replacement command is the same as that executed in step SP18 in FIG. 10, and an explanation thereof has been omitted.

With the computer system 130 according to this embodiment as described above, like the computer system 1 according to the first embodiment, data can be migrated from the migration source storage apparatus 4A to the migration destination storage apparatus 4B without stopping data transmission or reception between the host computer 2 and the storage apparatus (the migration source storage apparatus 4A or the migration destination storage apparatus 4B).

In addition, with the computer system 130 according to this embodiment, data stored in the logical device 71A in the migration source storage apparatus 4A is copied to the logical device 71B created by virtualizing the logical device 71A in the migration destination storage apparatus 4B; and then the write cache mode of that logical device 71B in the migration destination storage apparatus 4B is set "ON." Therefore, new data is stored also in the migration source logical unit 72A until copying of the migration source logical unit 72A in the migration destination storage apparatus 4B is completed. Furthermore, the host computer 2 deletes the path PT1 connected to the migration source logical unit 72A after the completion of data copying of the logical device 71B in the migration destination storage apparatus 4B. So, when a failure occurs in the migration destination logical unit 72B during the course of the data copy processing, it is possible to immediately return the path to the path PT1 connected to the migration source logical unit 72A without stopping data input to, or output from, the host computer 2.

Therefore, the computer system 130 according to this embodiment can have the advantage that even if a failure occurs in the migration destination storage apparatus 4B before the completion of data migration from the migration source storage apparatus 4A to the migration destination storage apparatus 4B and the path is returned to the migration source storage apparatus 4A, that would not affect data reading or writing.

(3) Other Embodiments

The aforementioned embodiments have described the case where the virtual devices 70A, 70B and the logical devices 71A, 71B are provided as intermediate storage tiers for associating the migration source logical units 72A with the storage devices 30A and the migration destination logical units 72B with the storage devices 30B, respectively. However, the present invention is not limited to this example, and the virtual devices 70A, 70B and the logical devices 71A, 71B are not necessarily inevitable and one of, or both, the virtual devices 70A and the logical devices 71A may be omitted.

Furthermore, another intermediate storage tier may be provided. When copying data stored in the migration source logical units 72A to the migration destination logical units 72B in this case, it is only necessary to create a second intermediate storage tier, which is associated with the storage devices 30B corresponding to one or more first intermediate storage tiers associating the migration source logical units 72A with the storage devices 30A in the second storage apparatus 4B, copy data from the migration source logical units 72A to the storage devices 30B in the second storage apparatus 4B via the first and second intermediate storage tiers, and then replace a part or whole of the first intermediate storage tier(s) with that of the second intermediate storage tier.

REFERENCE SIGNS LIST 1, 130 Computer systems
2 Host computer
3 Management computer
4A Migration source storage apparatus
4B Migration destination storage apparatus
10, 20, 40A, 40B CPUs
30A, 30B Storage devices
42A, 42B Cache memories
50, 132 Path management tables
51, 131 Alternate path programs
53, 142 Path management entries
60, 133 Logical unit migration command programs
70A, 70B, 70BX Virtual devices
71A, 71B, 71BX Logical devices
72A Migration source logical units
72B Migration destination logical units
105 Storage tier management program
106 Logical device copy program
144 Path status

The invention claimed is:

1. A data migration method for migrating data from a first storage apparatus to a second storage apparatus in a computer system comprising:
  a computer;
  the first storage apparatus on which a first storage device is mounted and which manages first logical units provided by a storage area of the first storage device; and
  the second storage apparatus on which a second storage device is mounted,
  the data migration method comprising:
  a first step, executed by the second storage apparatus, of virtualizing each of the first logical units in the first storage apparatus, managing them as second logical units, and setting configuration information about the first logical units to corresponding second logical units; and
  a second step of adding a path to the second logical units as an alternate path target, causing a status of a path connected to the first logical units to change to a standby state without deleting a setting of the path connected to the first logical units, notifying the change of the status of the path connected to the first logical unit to the first storage apparatus, copying data stored in the first logical units in the first storage apparatus to a storage area provided by the second storage device, and associating the storage area with the second logical units under the control of the second storage apparatus,
  wherein after the completion of data copying between the first and second storage apparatuses, the computer deletes the path connected to the first logical units,
  wherein if data which has not been migrated from the first storage apparatus to the second storage apparatus is a target of a read request from the computer, the second storage apparatus converts the read request from the computer to a read request to the first storage apparatus and the first storage apparatus processes the read request, and if data stored in the second storage apparatus is a target of the read request, the second storage apparatus processes the read request.

2. A data migration method according to claim 1, wherein in the second step, if a failure occurs in the path to the second logical units, the computer changes the status of the path connected to the first logical units in the standby state back to an active state.

3. A data migration method according to claim 1, wherein the second storage apparatus includes a cache memory for storing data read from the second logical units,
  wherein the second storage apparatus converts a read request from the computer to a read request to the first storage apparatus either when the cache mode of the cache memory is off, and when the cache mode of the cache memory is on and a data which has not been migrated from the first storage apparatus to the second storage apparatus is a target of the read request from the computer.

4. The data migration method according to claim 1, further comprising a management computer for managing data migration between the first and second storage apparatuses,
  wherein the first step and the second step are executed in accordance with a command from the management computer.

5. The data migration method according to claim 1, wherein during the copying of data stored in the first logical units in the first storage apparatus to the storage area provided by the second storage device, a data of a write request from the computer is stored in both the first and the second storage systems in response to the write request.

6. A system comprising:
  a computer;
  a first storage apparatus on which a first storage device is mounted and which manages first logical units provided by a storage area of the first storage device; and
  a second storage apparatus on which a second storage device is mounted,
  wherein the second storage apparatus virtualizes each of the first logical units in the first storage apparatus, manages them as second logical units, and sets configuration information about the first logical units to corresponding second logical units; and
  wherein the computer adds a path to the second logical units as an alternate path target and a status of a path connected to the first logical units is changed to a standby state without deleting a setting of the path connected to the first logical units, notifies the change of the status of the path connected to the first logical unit to the first storage apparatus, data stored in the first logical units in the first storage apparatus is copied to a storage area provided by the second storage device, and the storage area is associated with the second logical units under the control of the second storage apparatus,
  wherein after the completion of data copying between the first and second storage apparatuses, the computer deletes the path connected to the first logical units,
  wherein if data which has not been migrated from the first storage apparatus to the second storage apparatus is a target of a read request from the computer, the second storage apparatus converts the read request from the computer to a read request to the first storage apparatus and the first storage apparatus processes the read request, and if data stored in the second storage apparatus is a target of the read request, the second storage apparatus processes the read request.

7. A system according to claim 6, wherein if a failure occurs in the path to the second logical units, the computer changes the status of the path connected to the first logical units in the standby state back to an active state.

8. A system according to claim 6, wherein the second storage apparatus includes a cache memory for storing data read from the second logical units, wherein the second storage apparatus converts a read request from the computer to a read request to the first storage apparatus either when the cache mode of the cache memory is off, and when the cache mode of the cache memory is on and a data which has not been migrated from the first storage apparatus to the second storage apparatus is a target of the read request from the computer.

9. The system according to claim 6, further comprising a management computer for managing data migration between the first and second storage apparatuses.

10. The system according to claim 6, wherein during the copying of data stored in the first logical units in the first storage apparatus to the storage area provided by the second storage device, a data of a write request from the computer is stored in both the first and the second storage systems in response to the write request.

\* \* \* \* \*